(12) United States Patent
Tolstov et al.

(10) Patent No.: US 11,295,180 B1
(45) Date of Patent: Apr. 5, 2022

(54) FAST ACQUISITION OF LABELED VEHICULAR DATA FROM MULTIPLE DATA SOURCES

(71) Applicants: VOLKSWAGEN AKTIENGESELLSCHAFT, Wolfsburg (DE); AUDI AG, Ingolstadt (DE); DR. ING. H.C.F. PORSCHE AKTIENGESELLSCHAFT, Stuttgart (DE)

(72) Inventors: Oleg Tolstov, San Carlos, CA (US); Wenjing Zhang, Fremont, CA (US)

(73) Assignees: VOLKSWAGEN AKTIENGESELLSCHAFT, Wolfsburg (DE); AUDI AG, Ingolstadt (DE); DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 0 days.

(21) Appl. No.: 17/064,428

(22) Filed: Oct. 6, 2020

(51) Int. Cl.
*G06K 9/62* (2006.01)
*G06K 9/00* (2006.01)

(52) U.S. Cl.
CPC ........ *G06K 9/6289* (2013.01); *G06K 9/00711* (2013.01); *G06K 9/00791* (2013.01); *G06K 9/6253* (2013.01); *G06K 9/6256* (2013.01); *G06K 9/6262* (2013.01)

(58) Field of Classification Search
CPC .. G06K 9/6289; G06K 9/6262; G06K 9/6256; G06K 9/00711; G06K 9/6253; G06K 9/00791
See application file for complete search history.

(56) References Cited

U.S. PATENT DOCUMENTS

| | | |
|---|---|---|
| 2017/0206440 A1* | 7/2017 | Schrier ................. G05D 1/021 |
| 2018/0004210 A1* | 1/2018 | Iagnemma ......... G01C 21/3407 |
| 2020/0210715 A1* | 7/2020 | Golomedov ......... G05D 1/0248 |
| 2021/0263157 A1* | 8/2021 | Zhu ....................... G01S 17/931 |

* cited by examiner

*Primary Examiner* — Casey L Kretzer
(74) *Attorney, Agent, or Firm* — Wong & Rees LLP; Zhichong Gu

(57) ABSTRACT

Approaches, techniques, and mechanisms are disclosed for generating assisted driving test and evaluation data. According to one embodiment, video and non-video data are collected asynchronously through video and non-video data interface from an image acquisition device and a non-video data source collocated with the vehicle. Timing information received with the data is used to synchronize the video and non-video data into synchronized vehicle data. Specific labels indicating ground truths are identified to be applied to the synchronized vehicle data. Labeled vehicular data is generated from the synchronized vehicle data and the specific labels. At least a portion of the labeled vehicular data is to be used to test and evaluate assisted driving functionality.

24 Claims, 16 Drawing Sheets

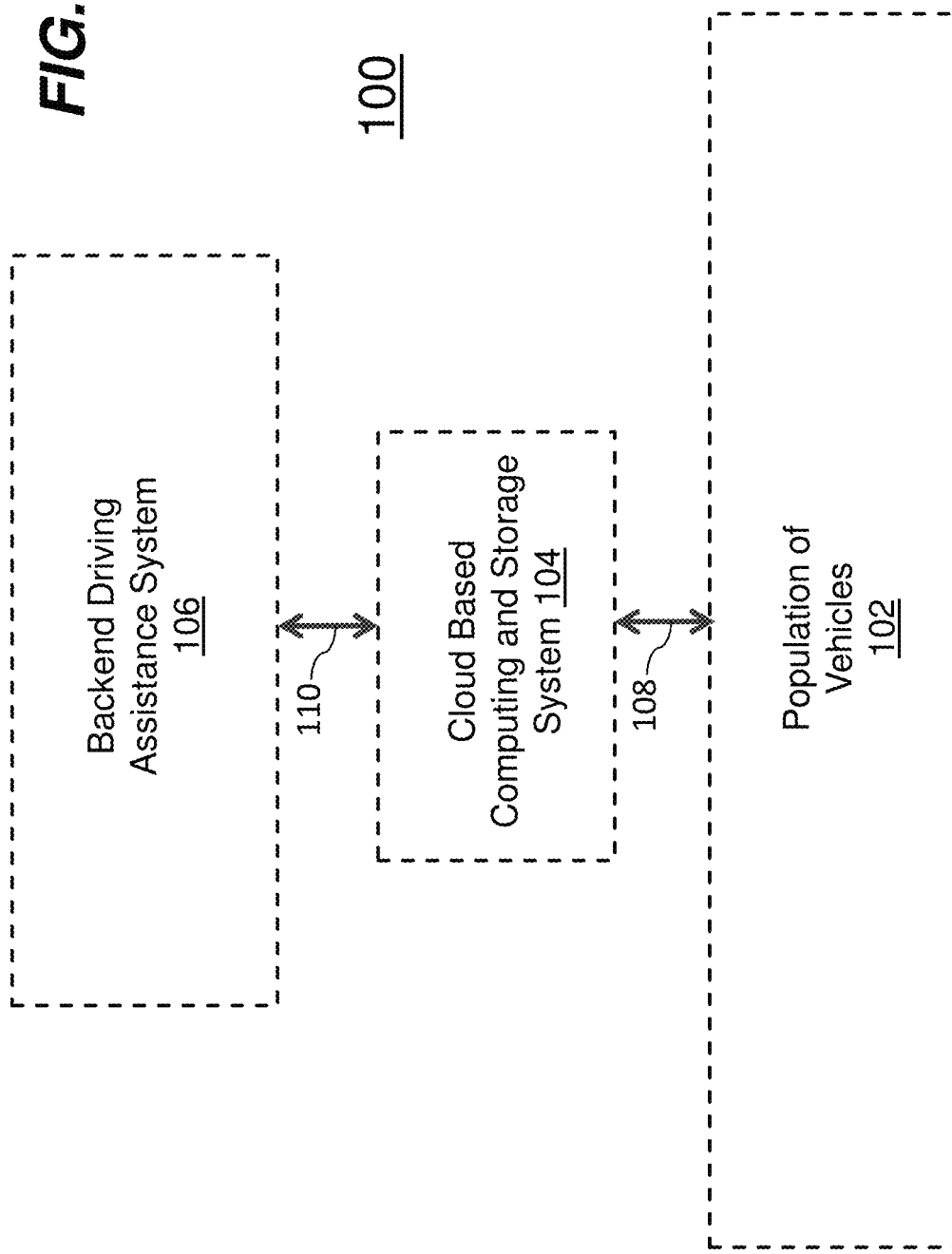

450

480

490

```
collect video data and non-video data
asynchronously 492
            │
            ▼
use timing information to synchronize the video
and non-video data 494
            │
            ▼
identify specific labels to be applied to the
synchronized vehicle data 496
            │
            ▼
generate labeled vehicular data from the
synchronized vehicle data and the specific labels
498
```

*FIG. 4I*

FAST ACQUISITION OF LABELED VEHICULAR DATA FROM MULTIPLE DATA SOURCES

TECHNICAL FIELD

Embodiments relate generally to testing and evaluating driving functions of vehicles, and, more specifically, to fast acquisition of labeled vehicular data from multiple data sources.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Video data and non-video data in connection with a vehicle may be collected and logged or recorded separately. For example, the video data may be recorded by a driver or passenger of the vehicle using mobile phones, dash-cams, go-pro devices, etc., while non-video data may be logged with an automatic vehicle data logger deployed with the vehicle such as Telemotive Loggers, GIN Loggers, etc.

The video data and non-video data collected with the vehicle may be informative of the vehicle's operational states, environments and driving or road conditions. The data may even be used to track the vehicle's locations and operations as well as driver behaviors. For example, video and non-video data collected with a vehicle during an auto accident may be reviewed manually by insurance professionals to help determine faults and responsibilities in the auto accident.

However, as video data and non-video data of various types in practice are collected from multiple data sources without mutual coordination, it is prone to incur high system costs as well as human costs to effectively connect the video data with the non-video data, much less use the video and non-video data to test or evaluate driving functions or features of vehicles.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 illustrates an example framework for testing and evaluating assisted driving functionality;

FIG. 4B through FIG. 4I illustrate example process flows involved in processing vehicle data.

DETAILED DESCRIPTION

Figure 2A:
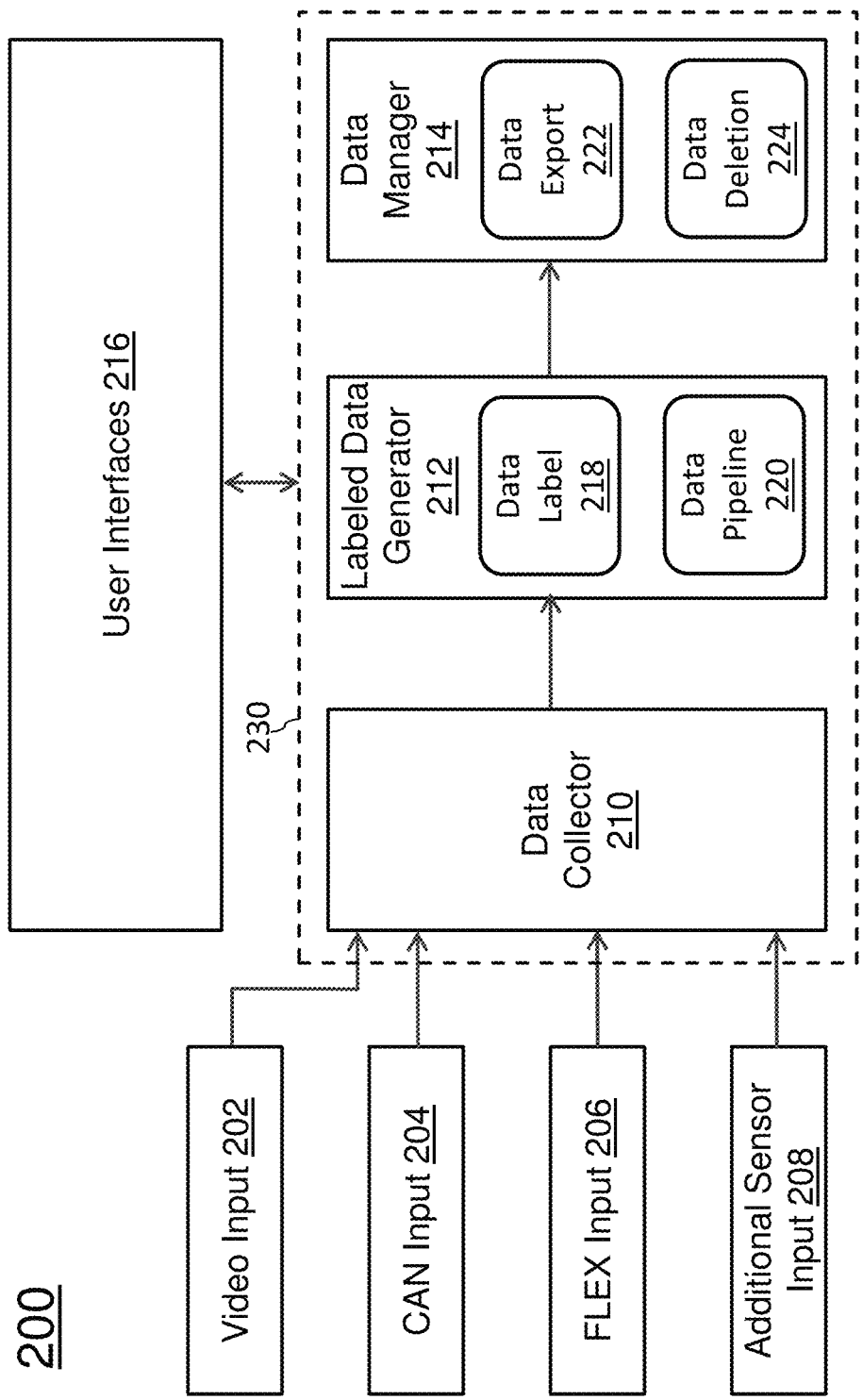
FIG. 2A illustrates an example test and evaluation system.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0. General Overview
2.0. Structural Overview
2.1. Test and Evaluation System
2.2. User Interface
2.3. Vehicle data collector
2.4. Labeled Vehicular Data Generator
2.5. Vehicular Data Label Block
2.6. Vehicular Data Pipeline Block
2.7. Vehicular Data Manager
2.8. Miscellaneous
3.0. Functional Overview
3.1. Event-Driven Data Processing
3.2. Video Data Processing
3.3. FLEX/CAN Data Processing
3.4. Geofence Data Processing
3.5. Sensor Data Processing
3.6. Manual Input Processing
3.7. Labeled Vehicular Data Generation
3.8. Labeled Vehicular Data Saving
4.0. Example Process Flows
5.0. Implementation Mechanism—Hardware Overview
6.0. Extensions and Alternatives

1.0. GENERAL OVERVIEW

Techniques as described herein can be used to support testing and evaluating driver assistance features and functions including but not limited to autonomous driving features and functions. A system implementing these techniques can operate in various driving environments with a wide variety of vehicle types. The system may operate in any of a variety of different test data recording/logging modes including but not limited to continuous recording/logging modes, corner case (or edge case) recording/logging modes, and so forth. A system as described herein can be implemented at relatively low costs with relatively high scalability and deployed with a vehicle with no or minimal impact or invasion on driving functions and operations of the vehicle.

In many operational scenarios, video and non-video vehicle data in connection with a vehicle may be continuously acquired and synchronized by a system collocated with the vehicle in real time from various data sources such as camera, sensors, vehicle components, modules, subsystems, etc.

Labels or ground truths, such as weather conditions, road conditions, driving conditions, and so forth, can be determined or identified for the synchronized vehicle data by the system collocated with the vehicle. These labels may include manual tagging labels generated based on user input and automatic tagging labels generated based on results of data analyses automatically performed on the collected video or non-video vehicle data.

The synchronized vehicle data and the labels can be combined to generate labeled vehicular data. The labeled vehicular data can be used as training data or testing data for training, testing or evaluating assisted driving functionality developed with artificial intelligence (AI) or machine learning (ML) algorithms, methods, procedures and/or predictive models.

The labeled vehicular data may be generated for trips made by the vehicle, fixed or non-fixed time period of operation, and/or for automatically detected or manually triggered corner cases. As used herein, corner cases may refer to those vehicle driving scenarios that are deemed or determined to be significantly deviate from or dissimilar to expected cases already identified or detected in past training/testing data.

To help increase AI/ML training and testing efficiency, the system collocated with the vehicle can identify or detect corner cases in situ using AI/ML algorithms, methods, procedures and/or predictive models to analyze the collected video or non-video vehicle data concurrently or contemporaneously collected from various data sources collocated with the vehicle.

Datasets in the labeled vehicular data relating to the corner cases can be specifically identified, detected, marked, generated, cached or saved by the system collocated with the vehicle. The datasets identified as relating to the corner cases can be uploaded in real time, in non-real time, or in offline operations, to a cloud based computing and storage system and/or a backend driving assistance system via communication networks such as wireless data networks.

The backend driving assistance system may implement the assisted driving functionality with AI/ML algorithms, methods, procedures and/or predictive models. Some or all of the AI/ML algorithms, methods, procedures and/or predictive models implemented or developed by the backend driving system may be the same as, inclusive of, or similar to, those deployed or installed in the system and/or driving assistance sub-system collocated with the vehicle.

A user interface (UI) may be implemented as a part of the test and evaluation system collocated with the vehicle. Display pages can be rendered by the UI to a user to solicit user input. The user input can be used to set manual tagging labels as well as trigger data recording for user-perceived corner cases.

As the labeled vehicular data—generated by the system collocated with the vehicle—comprises already synchronized vehicle data of various types such as synchronized video and sensor data, costly and time consuming operations such as ad hoc or post-mortem data synchronization and labeling that would be performed by data processors/contractors on vehicle data of various types under other approaches can be avoided under techniques as described herein. In addition, as the labeled vehicular data—generated by the system collocated with the vehicle—comprises the automatic and manual tagging labels for datasets in the synchronized vehicle data, ground truths can be readily extracted or ascertained from the labeled vehicular data by a recipient system. As a result, driving assistance functions or features can be developed relatively fast with relatively high efficiency and low costs under techniques as described herein.

Approaches, techniques, and mechanisms are disclosed for generating assisted driving test and evaluation data. Video data and non-video data are collected asynchronously through a video data interface from an image acquisition device and a non-video data interface from a non-video data source respectively. The image acquisition device and the non-video data source are collocated with a vehicle. Timing information received with the video data and with the non-video data is used to synchronize the video data and the non-video data into synchronized vehicle data. Datasets of the synchronized vehicle data share a common timeline. The common timeline indicates individual time points to which the datasets of the synchronized vehicle data respectively correspond. Specific labels are identified to be applied to the synchronized vehicle data. The labels are used to indicate ground truths for the synchronized vehicle data. Labeled vehicular data is generated from the synchronized vehicle data and the specific labels. At least a portion of the labeled vehicular data is used to test and evaluate the assisted driving functionality.

In other aspects, the invention encompasses computer apparatuses and computer-readable media configured to carry out the foregoing techniques.

2.0. STRUCTURAL OVERVIEW

FIG. 1 is an illustrative view of various aspects of an example framework 100 in which some or all techniques described herein may be practiced, according to an embodiment. The framework (100) comprises a population of vehicles 102, a cloud-based computing and storage system 104, a cloud-based or non-cloud-based backend driving assistance system 106, etc. Each system in the framework (100) may be implemented with one or more computing devices that comprise any combination of hardware and software configured to implement the various logical components described herein. For example, the one or more computing devices may include one or more memories storing instructions for implementing the various components described herein, one or more hardware processors configured to execute the instructions stored in the one or more memories, and various data repositories in the one or more memories for storing data structures utilized and manipulated by the various components.

The population of vehicles (102) may comprise vehicles of the same vehicle type or multiple different vehicle types. Example vehicles may include, without limitation, vehicles installed with driving assistance functionality (including but not limited to autonomous driving functionality), passenger vehicles, trucks, buses, gasoline vehicles, electric vehicles, hybrid powered vehicles, hydrogen powered, vehicle, etc.

The population of vehicles (102) may be deployed with in-vehicle systems (e.g., 200 of FIG. 2A, etc.) for testing and evaluating driving assistance functionality deployed with the vehicles. These test and evaluation systems may be developed, implemented and/or supported in part or in whole by the backend driving assistance system (106). Each vehicle in some or all of the vehicles (102) may be installed or deployed with a respective test and evaluation system as described herein.

In some operational scenarios, the test and evaluation systems deployed with the population of vehicles (102) collect vehicle data of various types, synchronize some or all of the vehicle data, identify corner cases in connection with trips, use synchronized vehicle data to generate labeled vehicular data for the identified corner cases and/or for the trips, etc.

As used herein, "labeled vehicular data" refers to a combination of unlabeled vehicular data and specific labels for the unlabeled vehicle data collected and/or generated by test and evaluation system(s) deployed with vehicle(s). A test and evaluation system as described herein outputs or provides the labeled vehicular data to the cloud-based computing and storage system (104) via one or more first network connections 108, for example periodically, in response to detecting external events (e.g., at the occurrence of corner cases, after a certain number of corner cases, after a certain labeled vehicular data volume is reached, etc.), in response to receiving data requests from the cloud-based computing and storage system (104), and so forth.

The labeled vehicular data received by the cloud-based computing and storage system (104) may include, but are not necessarily limited to only, some or all of: labels representing ground truths, the synchronized vehicle data, operational and fault data indicating malfunctions of components of respective vehicle, key performance indicators of respective vehicles, feature vectors and/or tensor data generated from the vehicle data, etc.

Labels as described herein may identify, but are not necessarily limited to only, one or more of the following ground truths for the labeled vehicular data: whether the data is collected continuously, intermittently, randomly, for specific trips, for specific locations, in response to automatically detected or user-triggered corner cases in a shadow mode or a non-shadow mode; which specific vehicle or specific vehicle type such as vehicle identification number (VIN), model and/or manufacturer (e.g., Volkswagen, Audi, etc.); relating to a specific driving scenario such as left turning, night driving, driving in a specific road conditions and/or type, driving in a specific weather condition, and so on; etc.

The labeled vehicle data collected from the test and evaluation systems deployed with the population of vehicles (102) may be provided by the cloud-based computing and storage system (104) to the backend driving assistance system (106) via one or more second network connections 110.

Example network connections—e.g., the first network connections (108) and the second network connections (110)—may include, but are not necessarily limited to, one or more of: Wi-Fi connections, wired connections, wireless data connections, optical data connections, LAN connections, WAN connections, etc.

The backend driving assistance system (106) may implement AI and/or ML algorithms, methods, models, etc., for driving assistance. The labeled vehicular data received by the backend driving assistance system (106) can be used as training data and/or testing data to enhance, train and/or test the AI and/or ML algorithms, methods, models, etc., for driving assistance. Additionally, optionally or alternatively, the backend driving assistance system (106) may use some or all the labeled vehicular data to perform data analyses and verifications, and develop or derive metrics and/or thresholds for identifying or detecting corner cases.

In some operational scenarios, the backend driving assistance system (106) may implement, train and/or test a driving assistance predictive model. The driving assistance predictive model may be implemented with artificial neural networks (or NN) such as based on TensorFlow, with non-neural-network techniques, with a generative model in which operational parameters are continuously, iteratively or recursively trained with training data. The driving assistance predictive model may be designed to use features/tensors of various feature/tensor types extracted or derived from unlabeled vehicular data to generate predicted data. Example predicted data may include, but are not necessarily limited to only, predicted or recommended driving decisions, expected features or tensors, expected distributions of features or tensors, metrics, thresholds, and so forth.

In a model training phase implemented by the backend driving assistance system (106), predicted data can be generated by the driving assistance predictive model use features/tensors (of the same types as those used in a model application phase) extracted or derived from the training data portion of the labeled vehicular data. Ground truths for the (training) predicted data can also be extracted or derived in part or in whole from the labels in the same training data portion of the labeled vehicular data.

Prediction errors may be estimated or measured by comparing the predicted data generated from the training data with the ground truths based on error functions, metrics functions, objective functions, distance functions or the like. Any of these functions may be used to measure differences, errors or prediction qualities between what represented in the ground truths and what represented in the predicted data generated with the training data. As a part of model training, optimized values for operational parameters (e.g., hidden layers, weights, activation functions, operational parameters relating to NN or hidden layers therein, etc.) of the driving assistance predictive model may be obtained by minimizing some or all of the prediction errors or enhancing the prediction qualities. In operational scenarios in which the predictive model is implemented with NNs, the prediction errors in the prediction data generated with the training data may be back propagated to update or optimize weights in connection with neurons and activation functions in the NNs.

In a model testing phase implemented by the backend driving assistance system (106), predicted data can be generated by the driving assistance predictive model use features/tensors (of the same types as those used in the model training phase) extracted or derived from the testing data portion (or a non-training data portion) of the labeled vehicular data. Ground truths for the predicted data can also be extracted or derived in part or in whole from the labels of in the testing data portion of the labeled vehicular data.

Prediction errors can be estimated or measured by comparing the predicted data generated from the testing data with the ground truths may be estimated or measured, for example with the same error functions, metrics functions, objective functions, distance functions or the like as in the training phase. In some operational scenarios, as a part of the model testing phase, metrics and/or thresholds may be set or generated based on some or all of the prediction errors estimated or measure with the testing data. These metrics and/or thresholds may be used to determine whether the predicted data significantly deviates from the ground truths such that the underlying vehicular data giving rise to the predicted data may be deemed to significantly deviate from past training/testing data. If that is the case, the underlying vehicular data may represent, or may be deemed as, a corner case (e.g., with a specific confidence level or score or probability, etc.) that is different from expected cases represented in the past training/testing data.

The metrics and/or thresholds (including but not limited to probabilities or probability distributions, confidence levels, confidence scores, error margins, etc.) developed or generated from the training data and testing data may be sent to and applied by a test and evaluation system as described herein to vehicular data and/or features/tensors generated from the vehicular data to determine whether the vehicular data (or portions thereof) represents that of a corner case and/or at what confidence level or probability, and so forth.

It should be noted that in various operational scenarios, training, testing and/or applying the AI/ML algorithms, methods, processes and/or predictive models as described herein can be performed iteratively, repeatedly, continuously, intermittently, and/or interleaved with one another. Additionally, optionally or alternatively, training, testing and/or applying the AI/ML algorithms, methods, processes and/or predictive models as described herein can be performed by one or more systems (e.g., distributed systems, at least partly by test and evaluation systems collocated with vehicles, using a thin client model, through cloud based computing, etc.) operating in cooperation with one another.

In some operational scenarios, the backend driving assistance system (106) may generate functional updates that implement or update the (e.g., continuously trained or tested, periodically trained or tested, pre-trained or pre-tested, etc.) AI/ML driving assistance predictive model. Example functional updates may include, but are not necessarily limited to only, some or all of: (e.g., vehicle-general, vehicle-specific, vehicle-type-general, vehicle-type-specific, geographic-general, geographic-specific, etc.) application packages or updates for test and evaluation systems deployed with some or all vehicles in the population of vehicles (102); (e.g., vehicle-general, vehicle-specific, vehicle-type-general, vehicle-type-specific, geographic-general, geographic-specific, etc.) application packages or updates for driving assistance functionality already installed or to be installed by driving assistance sub-systems of some or all vehicles in the population of vehicles (102); and so forth.

Some or all of these computer application packages or functional updates generated by the backend driving assistance system (106) may be propagated to some or all vehicles in the population of vehicles (102) in one or more different ways. For example, application packages or functional updates may be sent by the backend driving assistance system (106) to the cloud-based computing and storage system (103) for staging purposes. The application packages or functional updates may be pushed to, pulled or downloaded by test and evaluation systems or driving assistance sub-systems in some or all vehicles in the population of vehicles (102), for example wirelessly as over the air (OTA) updates via the one or more first network connections (108).

Additionally, optionally or alternatively, the backend driving assistance system (106) may request new labeled vehicular data (e.g., labeled vehicular data of new types, new labeled vehicular data of existing types, etc.) from some or all vehicles in the population of vehicles (102), for example for the purposes of obtaining more training data, more testing data, new metrics or thresholds, new feature/tensor types for a new/updated driving assistance predictive model.

Data requests may be originated and sent by the backend driving assistance system (106) to the cloud-based computing and storage system (103). In response to receiving the data requests from the backend driving assistance system (106), the cloud-based computing and storage system (103) sends the data requests (e.g., forwards the received data requests, sends new data requests derived from the received data requests, etc.) to some or all vehicles in the population of vehicles (102), for example wirelessly via the one or more first network connections (108).

In response to receiving the data requests from the cloud-based computing and storage system (103), test and evaluation systems deployed with some or all vehicles in the population of vehicles (102) generates and sends (e.g., ongoing, further, etc.) labeled vehicular data, for example wirelessly via the one or more first network connections (108). The labeled vehicular data can be collected by the test and evaluation systems continuously for trips or when corner cases are detected (e.g., in shadow mode automatically without any user input or initiation, in operational modes initiated by users such as drivers/passengers of vehicles, etc.).

2.1. Test and Evaluation System

FIG. 2A is an illustrative view of various aspects of an example test and evaluation system 200 in which some or all techniques described herein may be practiced, according to an embodiment. The system (200) can be implemented with one or more computing devices and deployed in a vehicle for testing and evaluating driving assistance functionality. The one or more computing devices comprise any combination of hardware and software configured to implement the various logical components described herein, including components such as vehicle data inputs including but not limited to a video input 202, a controller area network (CAN) input 204, a FLEX (or FlexRay) input 206 and an additional sensor input 208, a non-UI application part 230 of a computer application including but not limited to a vehicle data collector 210, a labeled vehicular data generator 212 comprising a data label block 218 and a data pipeline block 220, and a vehicular data manager 214 comprising a data export block 222 and a data deletion block 224, and a user interface (UI) 216. For example, the one or more computing devices may include one or more memories storing instructions for implementing the various components described herein, one or more hardware processors configured to execute the instructions stored in the one or more memories, and various data repositories in the one or more memories for storing data structures utilized and manipulated by the various components.

Tasks and operations performed the system (200) can complement tasks and operations performed in testing phase(s) by the backend driving assistance system (106). Under techniques as described herein, much if not all testing and evaluating driving assistance functions or features implemented with AI/ML algorithms, methods, processed and/or predictive models can be performed in situ in real time or near real time in vehicles in which the driving assistance functions or features are installed or implemented. Labeled vehicular data may be generated for trips, automatically detected or user triggered corner cases, randomly sampled vehicle data, vehicle data generated in a shadow or non-shadow mode, etc. Some or all of the labeled vehicular data can be provided by the test and evaluation system to the backend driving assistance system (106) directly or indirectly by way of the cloud based computing and storage system (104).

Figure 2B:
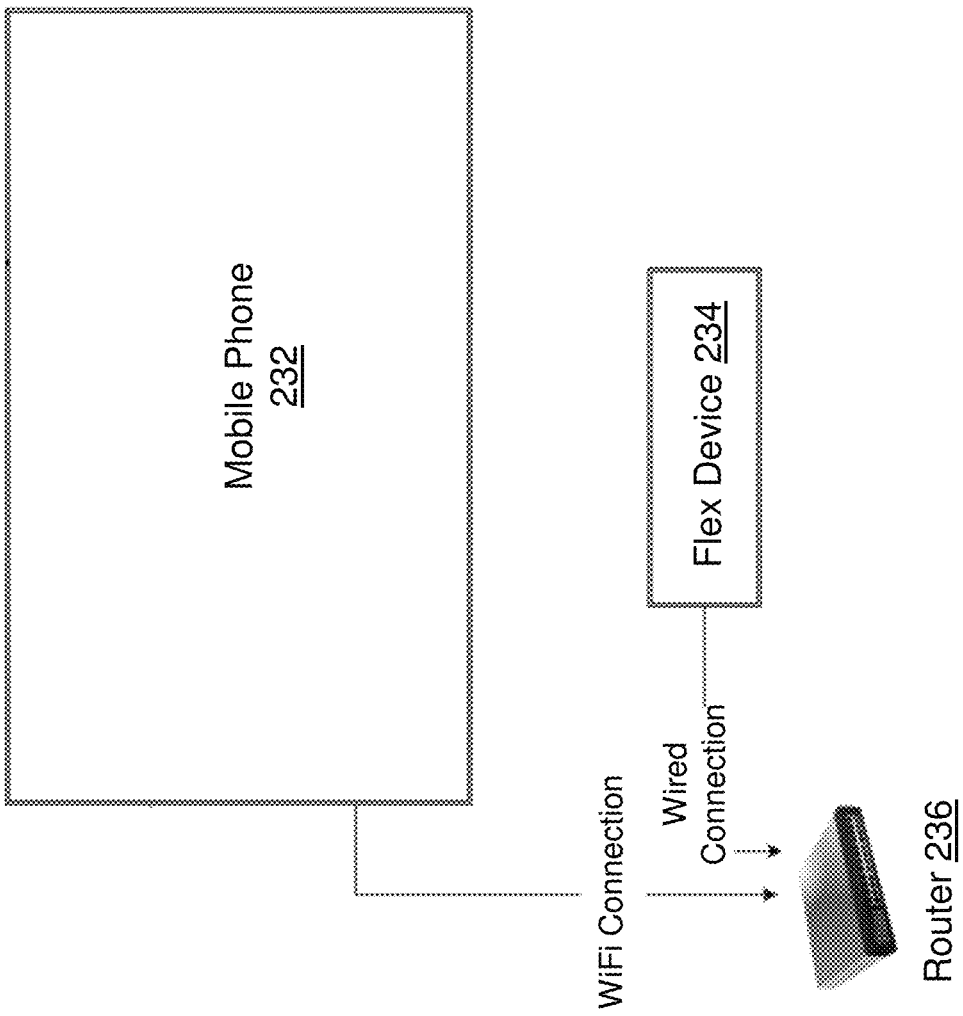
FIG. 2B and FIG. 2C illustrate example test and evaluation system configurations.

A variety of system configurations may be used to deploy or install the system (200) with or inside a vehicle. FIG. 2B illustrates an example system configuration that includes a mobile phone 232 (e.g., operated by a driver or passenger of the vehicle, etc.), a FLEX device 234 and a router 236. Each of the mobile phone (232) and the FLEX device (234) may be connected with the router (236) via Wi-Fi or wired connection and deployed with or inside the vehicle.

The system (200) or the mobile phone (232) therein may implement a non-UI application part (e.g., 230 of FIG. 2A, etc.) and a UI (e.g., 216 of FIG. 2A, etc.) on top of the non-UI application part (230). The UI (216) may comprise mobile app display pages (e.g., as illustrated in FIG. 3A through FIG. 3E, etc.) that include interactive and/or non-interactive UI components and/or UI controls. These display pages may be displayed or rendered on the mobile phone (232) for displaying information to and/or for interacting with a user of the mobile phone (232). Example mobile phones may include, but are not limited to, any of: Android phones, Android mobile devices, iOS phones, iOS mobile devices, non-Android non-iOS mobile devices or phones, etc.

In some operational scenarios, the FLEX device (234) may be operatively linked with automotive network communication networks already installed or deployed in the vehicle by the vehicle manufacturer of the vehicle to communicate with installed subsystems, electronic control units or modules (ECUs or ECMs) of the vehicle.

Example installed sub-systems, ECUs or ECMs may include, but are not necessarily limited to only, any, some or all of: vehicle sensors, driving assistance (including but not limited to autonomous driving) sub-systems, engine control unit, transmission, airbags, antilock braking/ABS, cruise control, electric power steering, audio systems, power windows, doors, mirror adjustment, battery and recharging systems for hybrid/electric cars, etc. Some or all the sub-systems, ECUs or ECMs may already be installed and/or maintained and/or updated as a part of the vehicle by the vehicle manufacturer of the vehicle.

To communicate with these installed vehicle components and/or in-vehicle automotive network communication networks, the FLEX device (234) may be configured to support one or more automotive network communications protocols such as FlexRay (e.g., as specified in an industry standard such as ISO 17458, etc.), CAN (e.g., as specified in an industry standard such as ISO 11898, etc.), Local Interconnect Network (LIN), Media Oriented Systems Transport (MOST), etc.

For the purpose of illustration only, the FLEX device (234) monitors/receives vehicle data from a subset in the installed vehicle components via CAN-based communications supported by the automotive network communication networks, and provide some or all the vehicle data received via the CAN based communications as CAN input (e.g., 204 of FIG. 2A, etc.) to a vehicle data collector (e.g., 210 of FIG. 2A, etc.) as a part of a computer application such as a mobile app on the mobile phone (232). Additionally, optionally or alternatively, the FLEX device (234) monitors/receives vehicle data from a subset in the installed components via FlexRay-based communications supported by the automotive network communication networks, and provide some or all the vehicle data received via the FlexRay based communications as FLEX input (e.g., 206 of FIG. 2A, etc.) to the vehicle data collector (210). Additionally, optionally or alternatively, the FLEX device (234) monitors/receives vehicle data from additional vehicle sensors in the installed components via non-FlexRay non-CAN communications supported by the automotive network communication networks, and provide some or all the vehicle data received from the additional vehicle sensors as additional vehicle sensors input (e.g., 208 of FIG. 2A, etc.) to the vehicle data collector (210).

The mobile phone (232) may include one or more mobile phone cameras that can be used to generate video data, which may be provided through a data interface such as a video input (e.g., 202 of FIG. 2A, etc.) to the vehicle data collector (210). It can be appreciated that the mobile phone can be replaced by other mobile devices, including a laptop, a tablet, a smart device, a portable computing device, and combinations thereof.

Figure 2C:
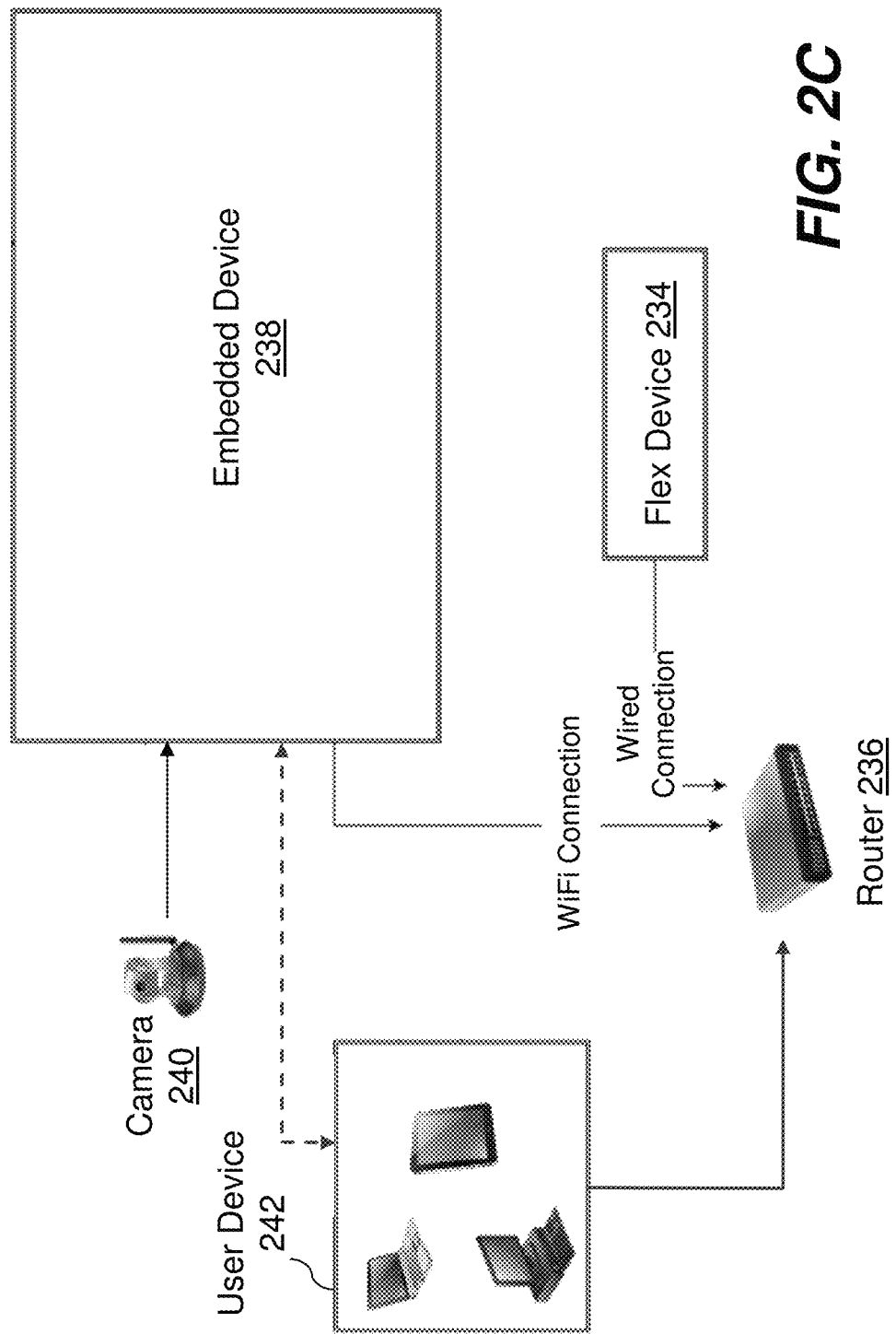

FIG. 2C illustrates another example system configuration that includes an embedded device 238, a FLEX device 234, a router 236 and a user device 242. Each of the embedded device (238), the FLEX device (234) and the user device (242) may be connected with the router (236) via Wi-Fi or wired connection and deployed with or inside the vehicle. Some or all of the functionality implemented with the system configuration of FIG. 2B may be replicated or implemented with the system configuration of FIG. 2C.

The embedded device (238) in FIG. 2C may implement a web-based UI (e.g., 216 of FIG. 2A, etc.) on top of the non-UI application part (230). The UI (216) may comprise web pages (e.g., as illustrated in FIG. 3A through FIG. 3E, etc.) that include interactive and/or non-interactive UI components and/or UI controls. These web pages may be served out from a web server implemented by the embedded device (238) to a web browser running on the user device (242) for displaying information to and/or for interacting with a user of the user device (242). Example user devices may include, but are not limited to, any of: tablet computers, mobile phones, laptop computers, etc.

Similar to the system configuration of FIG. 2B, in FIG. 2C, vehicle data may be collected by the FLEX device (234) to a vehicle data collector (e.g., 210 of FIG. 2A, etc.) implemented in the embedded device (238) in FIG. 2C. The embedded device (238) may be further operatively linked with one or more cameras such as USB cameras via USB connections. The cameras can be used to generate video data, which may be provided as video input (e.g., 202 of FIG. 2A, etc.) to the vehicle data collector (210) implemented in the embedded device (238).

Example vehicle data as described herein may include, but are not necessarily limited to only, any, (e.g., real time, non-real time, etc.) vehicle data relating to some or all of: driving assistance (including but not limited to autonomous driving), engine control unit, transmission, airbags, antilock braking/ABS, cruise control, electric power steering, audio systems, power windows, doors, mirror adjustment, battery and recharging systems for hybrid/electric cars, etc.

Regardless of which specific system configuration is adopted, the system (200) can communicate with the cloud-based computing and storage system (104) via one or more network connections. The network connections may be a part of the one or more first network connections (108) as illustrated in FIG. 1 between the system (200) and the cloud-based computing and storage system (104). In some operational scenarios, some or all of the network connections can be implemented using wireless data network services provided—to the mobile phone (232), the user device (242) or the router with a SIM card—by communication service providers, network operators, carriers, etc.

At one or more first time points/intervals, the vehicle or the system (200) therein may receive computer application packages and/or functional updates originated from the backend driving assistance system (106) by way of the cloud-based computing and storage system (104), for example over one or more network connections. As used herein, a time point/interval may refer to a time point/interval in real time, in near real time, in offline time, before trips, during trips, after trips, during vehicle idle times, at locations with relatively high quality communication services, at locations with relatively low cost Wi-Fi, wireless data or wired communication services, etc.

The computer application packages and/or functional updates received by the vehicle from the cloud-based computing and storage system (104) may be installed or used to update some or all processing blocks of the system (200) and/or may be installed or used to update the driving assistance sub-system of the vehicle within or without (or outside) the system (200).

In some operational scenarios, computer application packages and/or functional updates may include updates or implementations of a client version of a driving assistance predictive model and optimized values for operational parameters of the driving assistance predictive model. Additionally, optionally or alternatively, computer application packages and/or functional updates may include specifications for error/quality measuring functions error functions, distance functions, objective functions, metrics or thresholds used to determine or detect corner cases or non-corner cases (also referred to as expected or predicted cases), etc.

As a result, the system (200) can extract or generate features/tensors—e.g., of the same types used in the driving assistance predictive model for generating predicted data, of the new types requested by the backend driving assistance system (106) to enhance or modify the driving assistance predictive model, and so forth—from unlabeled vehicular data generated from the collected vehicle data (e.g., sensor data, video data, FLEX data, CAN data, etc.), for example while the unlabeled vehicular data and labels for the unlabeled vehicular data are being continuously or contemporaneously generated in situ in the vehicle.

Recommended or predicted driving decisions and/or expected distributions of features/tensors and/or expected error margins (or tolerances) and/or expected probabilities or probability distributions may be predicted, analyzed and/or determined by the system (200) from the driving assistance predictive model in part or in whole using the extracted features/tensors and metrics/thresholds. Actual driving decisions and/or actual distributions of features/tensors and/or actual error margins and/or actual probabilities or probability distributions may be determined by the system (200) from the unlabeled vehicular data, the driving assistance predictive model, the extracted features/tensors, etc.

Corner cases may be detected or identified by the system (200) through comparing actual driving decisions with the recommended driving decisions. Corner cases may be also detected or identified by the system (200) through comparing expected distributions with actual distributions, expected error margins with actual error margins and/or expected probabilities or probability distributions with actual probabilities or probability distributions. Corner cases may be further detected or identified by the system (200) through computing prediction error/quality values based in part or in whole on the error functions, distance functions, objective functions, etc., and comparing the computed prediction error/quality values with error/quality metrics and/or thresholds provided to the system (200) as a part of the received computer application packages or functional updates.

During trips continuously or in response to automatically detected or user-triggered corner cases, the system (200) can collect vehicle data, synchronize the collected vehicle data into unlabeled vehicular data, generate labels representing ground truths for the unlabeled vehicular data, combine the labels and the unlabeled vehicular data into labeled vehicular data, etc. Some or all of the labels (e.g., weather, road types, road conditions, etc.) may be generated by the data label block (218) through manual tagging based on user input received via the UI (216). Some or all of the labels (e.g., left turning, lanes, vehicle passing, etc.) may be generated by the data label block (218) through automatic tagging based on labeling data from the data pipeline block (220). The data pipeline block (220) may generate the labeling data from video data and/or sensor data in the vehicle data collected by the vehicle data collector (210) using a variety of data analysis methods, image analysis methods, computer vision methods, AI/ML methods, neural network based methods, and so forth.

At one or more second time points/intervals, the system (200) may send the labeled vehicular data—e.g., as a portion of overall labeled vehicular data generated by the population of vehicles (202)—to the backend driving assistance system (106) by way of the cloud-based computing and storage system (104), for example over the network connections.

2.2. User Interface

The system (200) comprises a UI 216 that interacts with a user to perform setup or configuration operations/tasks, data recording operations/tasks, pipeline selection operations/tasks, data labeling operations/tasks, upload management operations/tasks, and so forth.

Example setup and/or configuration operations/tasks performed through the UI (216) may include, but are not necessarily limited to only, any of: account login operations/tasks such as login to a valid account; entering or selecting manual labels for collected unlabeled vehicular data; entering or selecting vehicle information such as vehicle identification number or VIN of the vehicle; setup or configure in-car networks such as configuring router ID, password, IP address(es) for the mobile phone or the embedded device or the user device, Wi-Fi settings, gateway IP address and/or DHCP settings; etc.

Figure 3A:
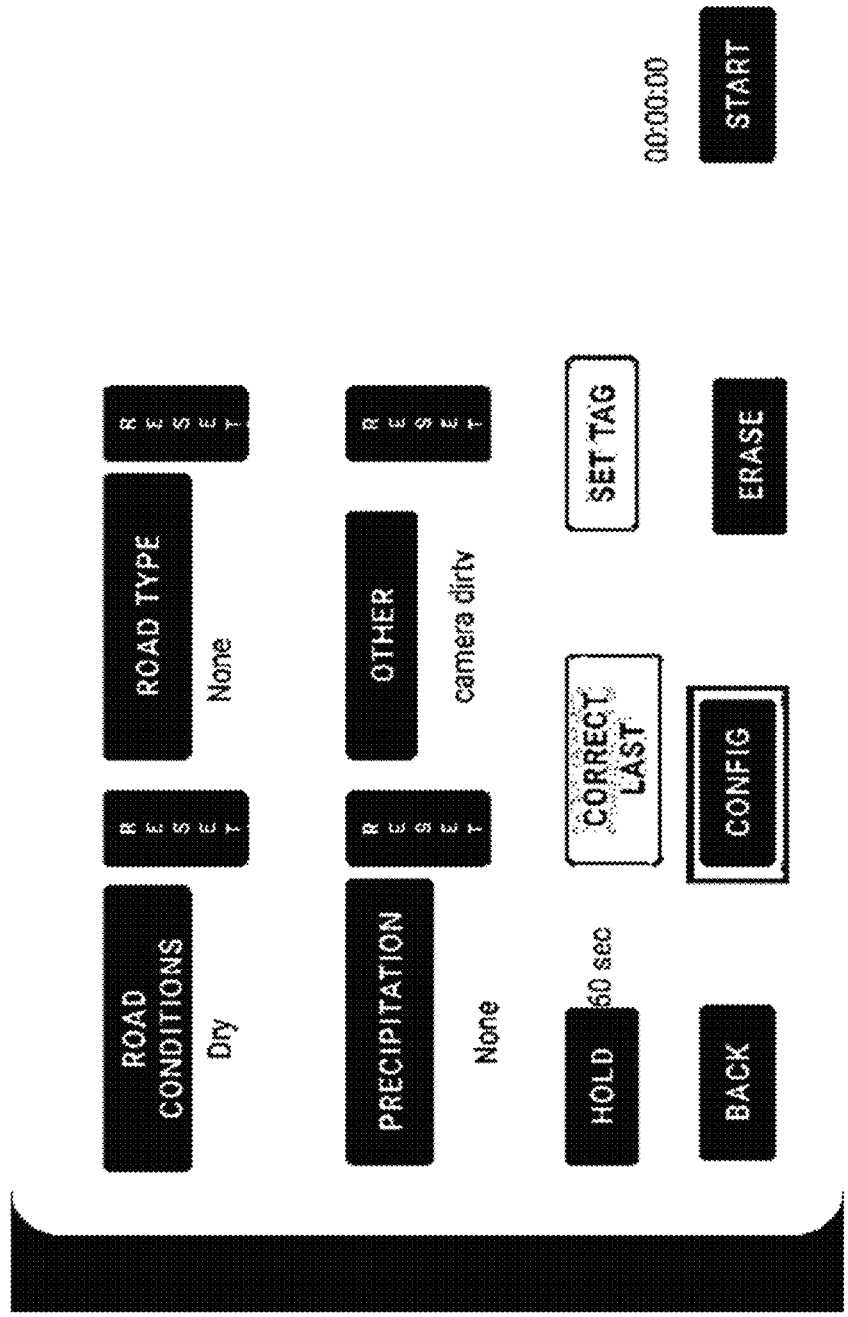
FIG. 3A through FIG. 3E illustrate example user interface (UI) display pages.

FIG. 3A illustrates an example display page provided by the UI (216), according to an embodiment. The display page may be an application page or a web page on which a number of interactive and/or non-interactive graphic user interface components are rendered to interact with user or to display information to the user.

In an example, the system (200) can receive user input indicating that the user has selected a graphic control button "CONFIG" (e.g., through touch pen, tactile tapping, mouse button, keystroke, etc.) on the display page. In response to receiving the user input, the UI (216) provides a further display page (not shown) for the user to select any, some or all recording options (e.g., recording video, recording GPS, recording FLEX input data, recording CAN input data, etc.) supported by the system (200) and brightness settings (for video recording).

In another example, the system (200) can receive user input indicating that the user is selecting or has selected a graphic control button "START" (e.g., through touch pen, tactile tapping, mouse button, keystroke, etc.) on the display page. In response to receiving the user input, the UI (216) starts video recording (e.g., via a phone camera, via an external USB camera, etc.). A captured video feed may be presented in a panel on the display page with timer information indicating a total recording time since the video recording is started, as illustrated in FIG. 3B.

Figure 3B:
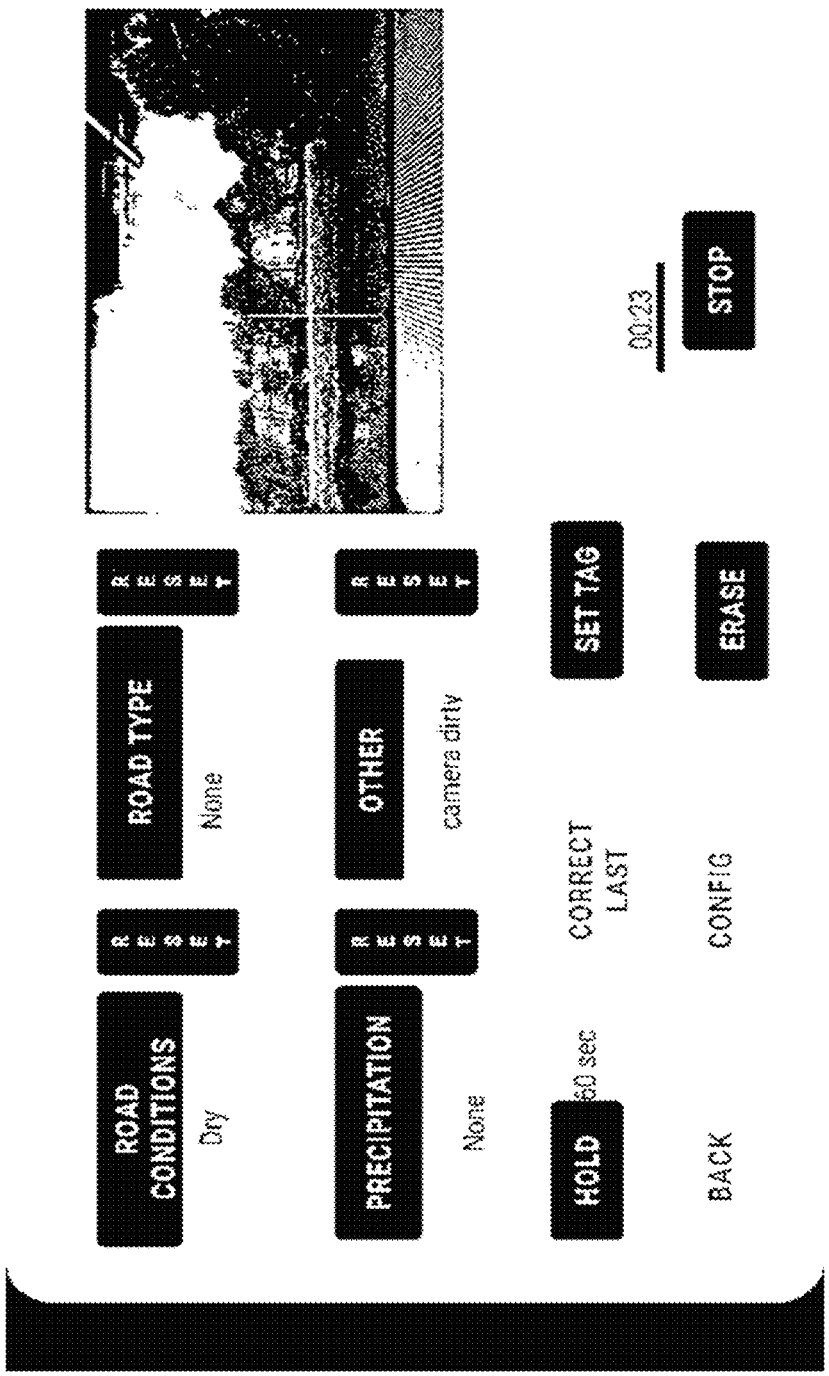

As illustrated in FIG. 3A and FIG. 3B, graphic control buttons "ROAD CONDITIONS," "ROAD TYPE," "PRECIPITATION", "OTHER", "HOLD", "SET TAG," "ERASE", etc., may be presented on a display page rendered by the UI (216). In response to receiving user input selecting any of these control buttons, the UI (216) can render additional UI components on the display page or additional display pages—e.g., display panes, display frames, popups, pulldown menus, radio buttons, etc.—for the user to enter (manual tagging) labels and/or perform, trigger and/or initiate other operations. These manually selected or entered labels may be automatically applied by the system (200) to unlabeled vehicular data generated from video and/or sensor data input collected by the system (200).

For example, in response to the user selecting the button "ROAD CONDITIONS," a new display page (not shown) may be rendered by the UI (216) for the user to manually select or input a to-be-applied label such as "Fully Dry," "Moist", "Wet", "Deep Water," "Snow: Partially," "Snow: Free Track," "Snow: Fully Covered," "Ice", "Dirt", etc. When the backend driving assistance system (106) receives vehicular data portions with this label, driving assistance algorithms, methods, processes and/or predictive models can be trained accordingly to generate possibly different/differentiated driving assistance recommendations, decisions, predictions and/or operations for different road conditions.

In response to the user selecting the button "ROAD TYPE," a new display page (not shown) may be rendered by the UI (216) for the user to manually select or input a to-be-applied label such as "Asphalt", "Silent Asphalt," "Concrete", "Cobble Stone," "Dirt Road," "Gravel", "Sand", "Other", etc. When the backend driving assistance system (106) receives vehicular data portions with this label, driving assistance algorithms, methods, processes and/or predictive models can be trained accordingly to generate possibly different/differentiated driving assistance recommendations, decisions, predictions and/or operations for different road types.

In response to the user selecting the button "PRECIPITATION", a new display page (not shown) may be rendered by the UI (216) for the user to manually select or input a to-be-applied label such as "Raining", "Heavy Rain," "Foggy", "Snowing," "None," etc. When the backend driving assistance system (106) receives vehicular data portions with this label, driving assistance algorithms, methods, processes and/or predictive models can be trained accordingly to generate possibly different/differentiated driving assistance recommendations, decisions, predictions and/or operations for different precipitations.

In response to the user selecting the button "OTHER", a new display page (not shown) may be rendered by the UI (216) for the user to manually select or input a to-be-applied label such as "Camera Dirty," a manually entered text for a new corner case encountered by the user, etc. When the backend driving assistance system (106) receives vehicular data portions with this label, driving assistance algorithms, methods, processes and/or predictive models can be trained accordingly to generate possibly different/differentiated driving assistance recommendations, decisions, predictions and/or operations for different label values/texts.

In response to the user selecting the button "HOLD", a new display page (not shown) may be rendered by the UI (216) for the user to manually select an available recording duration (e.g., for each corner case automatically detected by the system (200), for each user triggered data recording, etc.) such as one (1) second, sixty (60) seconds, 300 seconds, 600 seconds, etc.

Figure 3C:
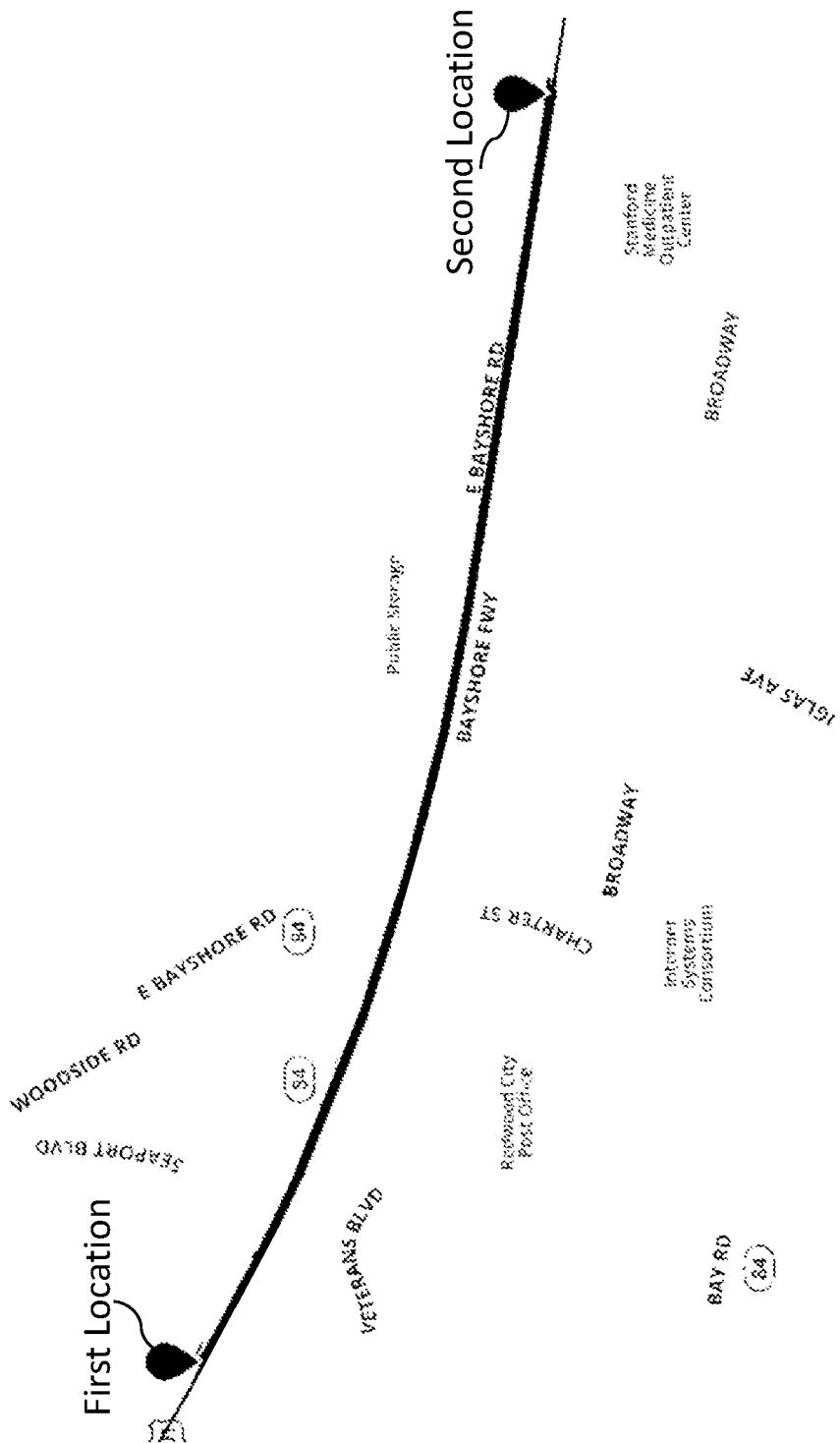

In response to the user selecting the button "SET TAG," the system (200) applies selected marks/labels to the vehicular data generated on a route, starting from a first location of the vehicle at which this button is selected to a second location of the vehicle after a time length such as the recording time selected by the user as illustrated in FIG. 3C.

In response to the user selecting the button "ERASE", the system (200) deletes or removes the previously collected vehicle or previously generated vehicular data for a time length such as up to a user specified time period (e.g., 300 seconds, etc.).

Figure 3D:
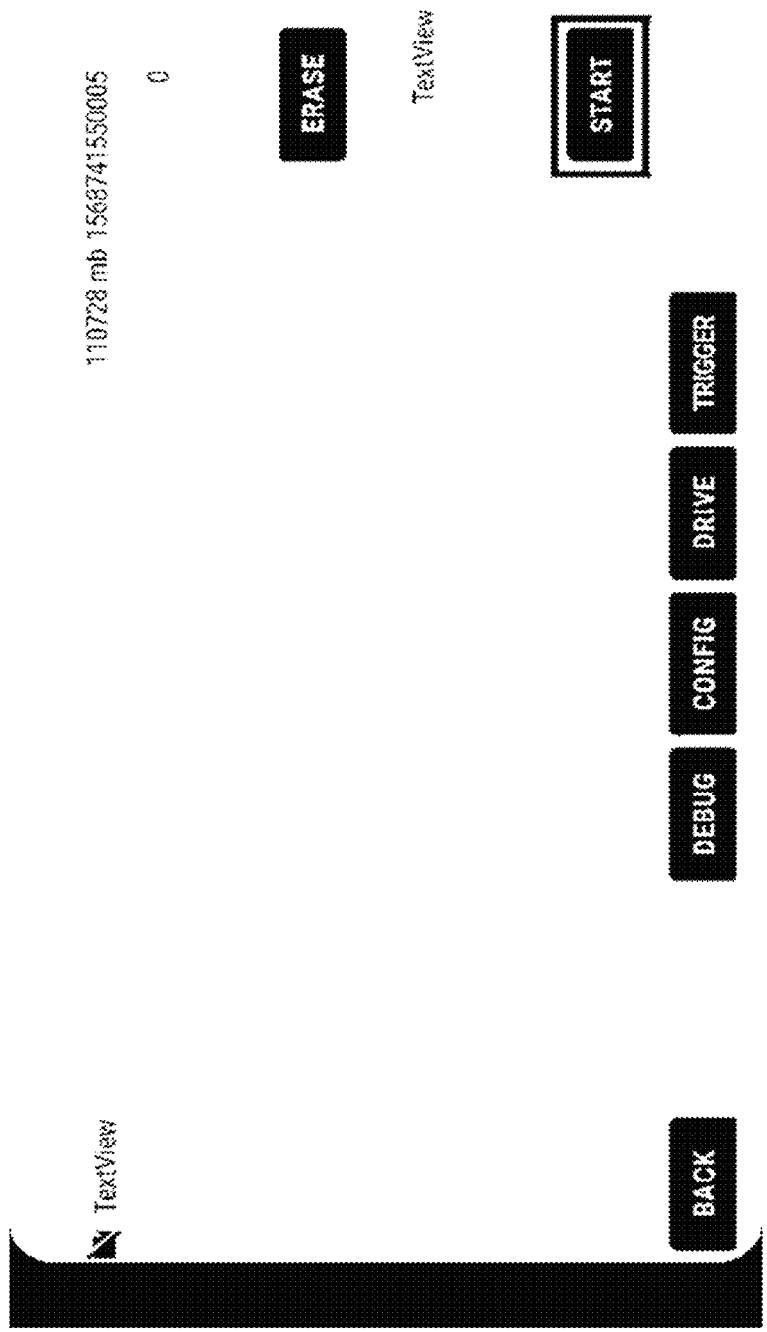

FIG. 3D illustrates an example display page provided by the UI (216), according to an embodiment. The display page comprises a number of interactive and/or non-interactive graphic user interface components to interact with user or to display information to the user.

The system (200) can receive user input indicating that the user is selecting or has selected a graphic control button "START" (e.g., through touch pen, tactile tapping, mouse button, keystroke, etc.) on the display page. In response to receiving the user input received via the UI (216), the system (200) starts synchronized video and sensor data recording based on vehicle data collected from the video input (202), FLEX input (204), CAN input (206) and/or additional sensor input (208) and generates labels through manual and/or automatic tagging operations performed by the labeled vehicular data generator (212) (or the data label block (218) and the data pipeline block (220) therein).

Figure 3E:
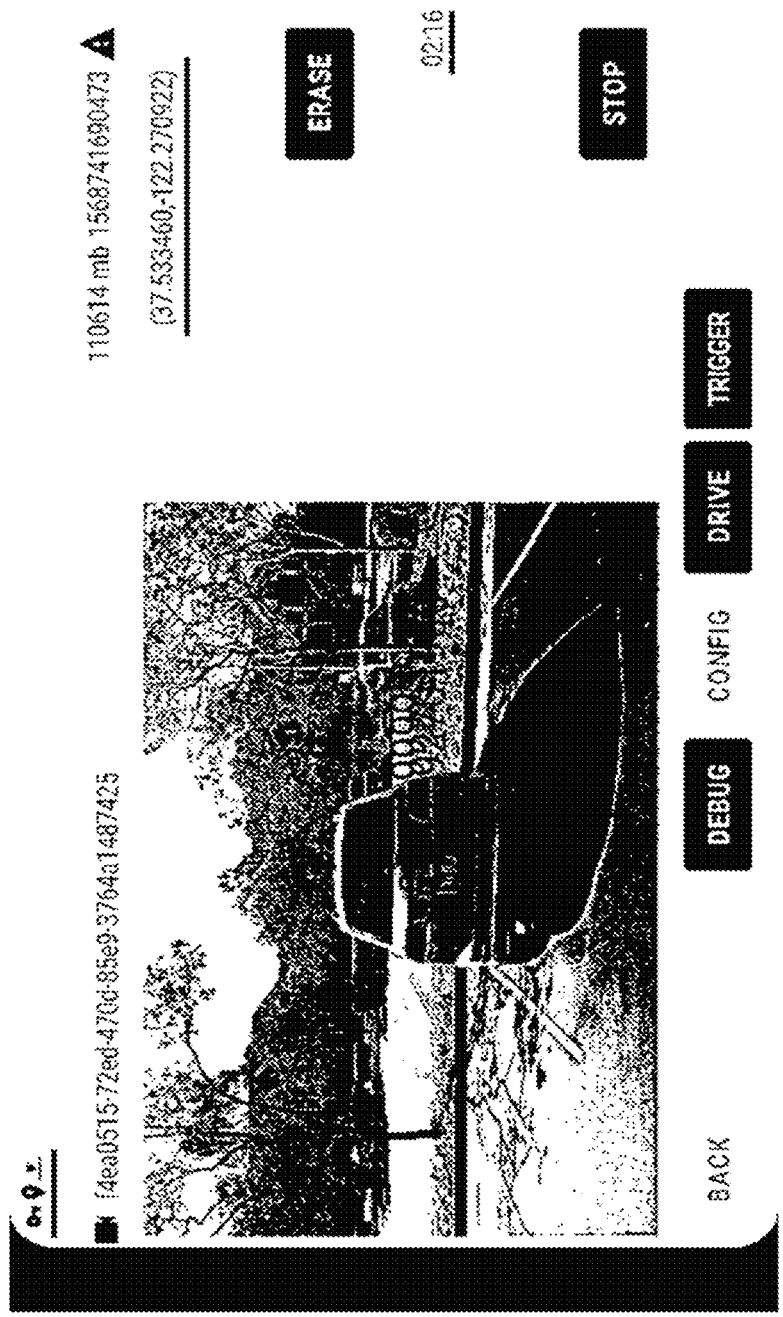

A captured video feed may be presented in a panel on the display page with timer information indicating a total recording time since the video recording is started, as illustrated in FIG. 3E. GPS data (e.g., above the "ERASE" button, etc.) synchronized to the video data and other sensor data may also be displayed. Any corner case detection can be indicated on the display page, for example through a graphical icon.

In some operational scenarios, the user may encounter a corner case or notice a driving situation that is believed to be a possible corner case, but the system (200) may not automatically detect the user-perceived corner case as a corner case. The user can trigger vehicular data recording for a user-perceived corner case by selecting or clicking the button "TRIGGER". In response to the user selecting the button "TRIGGER", the system (200) records collected vehicle data and/or generated vehicular data for a time length such as up to a user specified time period (e.g., 300 seconds, etc.).

Additionally, optionally or alternatively, display pages may be presented to the user to obtain user input relating to requesting downloading and updating geofence data, pipeline modules, software updates/patches for one or all portions of the system (200), etc., from other systems such as cloud-based computing and storage system (104).

2.3. Vehicle Data Collector

The system (200) comprises a vehicle data collector 210 that collects vehicle data from the video input (202), FLEX input (204), CAN input (206) and/or additional sensor input (208) in connection with trips and/or automatically detected or user-triggered corner cases in the trips. Some or all of the vehicle data may be real time or near real time vehicle data such as generated in real time by a camera operatively linked to the system (200), by a GPS module or device (e.g., as a part of the vehicle, mobile phone, etc.), by electronic control units/modules in the vehicle, and so forth. Some or all of the vehicle data may be real time or near real time vehicle data such as operational and/or fault states of various components of the vehicle. Some or all of the vehicle data may be real time or near real time vehicle data relating to driving assistance functionality implemented by the vehicle and/or by the system (200 deployed with the vehicle.

Different types of vehicle data may be individually or independently collected by the vehicle data collector (210) through their respective input data interfaces without synchronization of data collection activities among the different input data interfaces. For example, video data such as video bitstreams/segments (in compliance with a video coding standard such as MPEG-2, MPEG-4, AVC, HEVC, etc.), sequences of consecutive compressed or uncompressed video images, etc., may be collected by the vehicle data collector (210) through an input data interface such as the video input (202). In addition, different portions of non-video vehicle data may be individually or independently collected by the vehicle data collector (210) through input data interfaces such as FLEX input (204), CAN input (206) and/or additional sensor input (208).

Data collection activities through one of the input data interfaces such as one of the video input (202), FLEX input (204), CAN input (206) and/or additional sensor input (208) may be individually or independently performed by the vehicle data collector (210) without synchronizing with other data collection activities through others of the input data interfaces.

While different types of vehicle data can be collected without synchronization, timing information for some or all of the collected vehicle data of different types can be received or determined by the vehicle data collector (210), for example through timestamps received or generated in connection with individual data units/frames/segments/images in the collected vehicle data. Example timing information as described herein may include, but is not necessarily limited to only, any of: timing information generated by video encoder used to compress or encode video data, timing information in GPS data, timestamps generated and/or inserted into data units transmitted by data transmitters, timestamps generated when data units received by data receivers implemented in the input data interfaces, and so forth.

The timing information may be stored, cached and/or enqueued as a part of the vehicle data collected by the vehicle data collector (210). For example, the timing information for the vehicle video data may be stored, cached and/or enqueued as a part of the vehicle video data collected by the vehicle data collector (210). Respective timing information for non-video vehicle data of each different (data) type may be stored, cached and/or enqueued as a part of the non-video vehicle data of that (data) type collected by the vehicle data collector (210).

The collected vehicle data including the timing information may be provided by the vehicle data collector (210) to the labeled vehicular data generator (212) for further processing.

2.4. Labeled Vehicular Data Generator

The system (200) comprises a labeled vehicular data generator 212 that receives the collected vehicle data comprising the timing information, uses the timing information to synchronize different types of vehicle data in the collected vehicle data into unlabeled vehicular data, perform manual and/or automatic tagging operations to generate or set labels for the (synchronized) unlabeled vehicular data, combined the labels with the unlabeled vehicular data into labeled vehicular data, send or provide the labeled vehicular data to the vehicular data manager (214), etc. The labels may be represented by one or more of: data marks, binary values, numeric or non-numeric values, textual values, ENUM values for a plurality of possible values, etc.

The labeled vehicular data generator (212) may be continuously (e.g., in shadow mode, for entire durations of trips, etc.) and/or intermittently (e.g., for automatically detected corner cases, for user triggered corner cases, etc.) outputting the labeled vehicular data in real time or in near real time to other parts of the system (100) such as the vehicular data manager (214).

2.5. Vehicular Data Label Block

The system (200) or the labeled vehicular data generator (212) comprises a vehicular data label block 218 that receives manual tagging labels (or ground truths) specified by user input from user interactions with the UI (216), receives automatic tagging labels generated by the data pipeline block (220), receives user indications or triggers of corner cases from user interactions with the UI (216), receives automatically (e.g., without user interaction or input, etc.) generated indications of corner cases from the data pipeline block (220), applies the automatic and/or manual tagging labels to a current portion of the unlabeled vehicular data for a current time period (e.g., a time period in a sequence of continuous or consecutive time periods in a shadow operational mode or non-shadow operational mode, an entire time duration of a current trip, corresponding to a fixed time interval such as 300 seconds, etc.) to generate a corresponding current portion of the labeled vehicular data for the current time period. Some or all operations performed by the vehicular data label block (218) based on user input received via the UI (216) may be referred to as manual tagging. Some or all operations performed by the vehicular data label block (218) based on input received from the data pipeline block (220) may be referred to as automatic tagging.

The vehicular data label block (218) may be continuously (e.g., in shadow mode, for entire durations of trips, etc.) and/or intermittently (e.g., for automatically detected corner cases, for user triggered corner cases, etc.) performing manual and/or automatic tagging operations.

For example, a mobile phone running an mobile app inside a vehicle or an embedded device with embedded firmware/software operating with a user device, which may be connected through FLEX and CAN networks through a router, can collect vehicle data, synchronize the collected vehicle data into unlabeled vehicular data, label the unlabeled vehicular data with ground truths in real time to generate labeled vehicular data while the unlabeled vehicular data is being continuously generated, upload the labeled vehicular data to a cloud-based computing and storage system, allow a backend driving assistance system operating with the cloud-based computing and storage system to use the labeled vehicular data as training data to test, evaluate and optimize its AI/ML based driving assistance functionality (e.g., functions, features, etc.), etc. Driving assistance functions/features can be (e.g., continuously, periodically, on demand, in phases, etc.) updated, optimized, downloaded and/or deployed to some or all vehicles in the population of vehicles (102) of FIG. 1. As a result, time consuming and expensive ad hoc manual review and labeling of video data and sensor data that was previously collected by data loggers under other approaches can be avoided or reduced under techniques as described herein.

2.6. Vehicular Data Pipeline Block

The system (200) or the labeled vehicular data generator (212) therein comprises a data pipeline block 220 that may implement a plurality of data pipeline operations or modules—which may be referred to as pipeline modules—to perform video data analyses, sensor data analyses, etc.; to extract features or generating tensors from underlying video and sensor data; to compare actual features/tensors with expected ranges or distributions of features/tensors; to compare actual driving recommendations with predicted driving recommendations generated from the driving assistance predictive model; to determine qualities/errors in the actual features/tensors or the predicted driving recommendations; to detect or determine whether a corner case has occurred; etc.

These data pipeline operations or modules may operate with one another in parallel, in series, or partly in parallel partly in series. The data pipeline block (220)—or the pipeline modules therein—may include, but are not limited to, an implementation of a client (e.g., mobile app, embedded software, vehicle-specific, vehicle-model-specific, vehicle-manufacturer-specific, etc.) version of the same AI/ML algorithms, methods, processes and/or predictive models for driving assistance functionality.

The features/tensors extracted and/or generated by the pipeline modules may be of some or all of the same types used by the backend driving assistance system (106)) to test, evaluate and/or train AI/ML algorithms, methods, processes and/or predictive models for driving assistance functionality. Additionally, optionally or alternatively, the features/tensors extracted and/or generated by the pipeline modules may be of new types requested by the backend driving assistance system (106)) to expand or implement new or modified AI/ML algorithms, methods, processes and/or predictive models for driving assistance functionality.

The pipeline modules in the data pipeline block (220) may implement AI algorithms, methods, processed and/or predictive models with NNs. These NNs may have been (e.g., previously, continuously, etc.) trained or configured by the backend driving assistance system (106) using already received labeled vehicular data as training data. Operational parameters of the NNs as optimized through training may be provided to the system (200) by the backend driving assistance system (106) by way of the cloud-based computing and storage system (104) as a part of computer application packages, functional updates, OTA updates, etc. Additionally, metrics and thresholds used to identify corner cases or non-corner cases (or expected cases) may be provided to the system (200) by the backend driving assistance system (106) by way of the cloud-based computing and storage system (104) as a part of computer application packages, functional updates, OTA updates, etc.

The pipeline modules or the NNs implemented therein may operate with the optimized operational parameters, metrics and/or thresholds to extract features or generate tensors from the collected vehicle data; to use some or all of the features/tensors, operational parameters, metrics and/or thresholds to determine whether the collected vehicle data pertains to a corner case or an expected case; to use some or all of the features/tensors, operational parameters, metrics and/or thresholds to generate automatic tagging labels; etc. The data pipeline block (220) provides indications of detected corner cases and/or the automatic tagging labels as determined or generated with the pipelines to the vehicular data label block (218), etc.

Example pipeline modules may include, but are not necessarily limited to only, those relating to any, some or all of: lane detection/classification (e.g., generating labels, features and/or tensors to indicate which traffic lane(s) the vehicle is in, leaving, entering, turning left, turning right, transitioning from one lane to another, etc.), object detection/classification (e.g., generating labels, features and/or tensors to indicate one or more boxes in an image in the video data, where each of the boxes may indicate a detected object and/or a type of the detected object, etc.), object variance and dropout detection/classification (e.g., generating labels, features and/or tensors to indicate time varying appearances, disappearances, sizes or motions of one or more boxes in an image in the video data, where each of the boxes may indicate a detected object and/or object type, etc.), novelty (case or data) detection/classification (e.g., generating labels, features and/or tensors to indicate a likelihood of an expected case or a corner case based on the metrics and/or thresholds, etc.), pass detection/classification (e.g., generating labels, features and/or tensors to indicate whether the vehicle is performing a vehicle passing operation in relation to other vehicles, etc.), random detection/classification (e.g., randomly sample video and/or sensor data to be included and identified as appropriate in the labeled vehicular data, etc.).

In some operational scenarios, some or all of the pipeline modules may include NNs implementing you-only-look-once (Yolo) algorithms/methods, single-shot-multi-box (SSD) algorithms/methods, etc. These NNs included in the pipeline modules of the data pipeline block (220) may operate with optimized operational parameters received from the backend driving assistance system (106).

In real time or near real time, the NNs of one or more different types can be applied to original or downsampled video images in the video data such as road images, RGB images, LIDAR images, etc., to output detected/recognized bounding boxes in the images and respective types of the objects in the bounding boxes. The types of the objects detected in the images may be used to generate or determine automatic tagging labels. The bounding boxes, their sizes, their types, automatic tagging labels, etc., may be outputted by the pipeline modules as single-dimensional or multi-dimensional features, tensors, arrays, lists, and so on. and/or arrays. Labeled vehicular data generated under techniques as described herein can be recorded and used to train the NNs implemented in a cloud based system such as the backend driving assistance system (106) of FIG. 1. For example, NNs used to recommend assisted or autonomous driving decisions including but not limited some or all of the NNs in the pipeline modules can be trained relatively efficiently with low costs by the backend driving assistance system (106). Improved or optimized operational parameters for the cloud trained NNs can be propagated from the cloud based system to the system (200) deployed with the vehicle or to driving assistance sub-system(s) or module(s) of the vehicle. These NNs with the improved or optimized operational parameters can operate with or in the vehicle to generate predicted data such as recommended driving decisions, features, tensors, etc., and/or labeled vehicular data on an ongoing basis.

The vehicular data pipeline block (220) may be continuously (e.g., in shadow mode, for entire durations of trips, etc.) and/or intermittently (e.g., for automatically detected corner cases, for user triggered corner cases, etc.) outputting automatic tagging labels, single-dimensional or multi-dimensional features, tensors, arrays, lists, and so on in real time or in near real time to other parts of the system (100) such as the vehicular data label block (218).

2.7. Vehicular Data Manager

The system (200) comprises a vehicular data manager 214 that may include a data export block 222, a data deletion block 224, etc., to receive labeled vehicular data from the labeled data generator (212) and perform data management operations with respect to the received labeled vehicular data. Example data management operations as described herein may include, but are not necessarily limited to only, any of: exporting, creating, retrieving, storing, accessing, modifying, updating, deleting data, etc.

The data export block (222) may implement a data interface to store some or all of the labeled vehicular data to a cloud based system such as the cloud based computing and storage system (104). A mobile phone (e.g., 232 of FIG. 2B, etc.), embedded device (e.g., 238 of FIG. 2B, etc.), user device (e.g., 242 of FIG. 2B, etc.), etc., in the system (200) may have a relatively limited storage space for storing generated labeled vehicular data. Thus, most if not all of the labeled vehicular data can be exported from the system (200) or the data export block (222) therein to one or more cloud based systems such as public cloud based storage systems (e.g., Amazon Web Services or AWS, YADA, etc.) or proprietary cloud based storage systems (e.g., implemented by Audi, Volkswagen, Porsche, etc.).

In some geographic regions or jurisdictions, in compliance with data privacy laws/regulations/standards (e.g., General Data Protection Regulation or GDPR, etc.), the system (200) or the data deletion block (224) therein may be configured to determine whether some or all vehicle data collected by the system (200), some or all labeled vehicular data generated by the system (200), etc., should be deleted or prevented from being uploaded to an external system or a cloud based storage system such as the cloud based computing and storage system. This determination may be based on an elapsed time (e.g., last 5 minutes, last ten minutes, etc.) in which a user has not indicated that such data should be deleted. This determination may also be based on user input received from a user (e.g., via the UI (216) of FIG. 2A, etc.) that indicates whether such data (e.g., last 5 minutes, last ten minutes, etc.) should be deleted or uploaded to the external system or a cloud based storage system.

In response to determining that some or all of the labeled vehicular data (e.g., last 5 minutes, last ten minutes, etc.) is to be deleted, the system (200) or the data deletion block (224) therein deletes the data and prevents the data from being exported to the external system or a cloud based storage system

2.8. Miscellaneous

The systems (100 and 200) illustrate only one of many possible arrangements of components configured to provide the functionality described herein. Other arrangements may include fewer, additional, or different components, and the division of work between the components may vary depending on the arrangement.

3.0. FUNCTIONAL OVERVIEW

In an embodiment, some or all techniques and/or methods described below may be implemented using one or more computer programs, other software elements, and/or digital logic in any of a general-purpose computer or a special-purpose computer, while performing data retrieval, transformation, and storage operations that involve interacting with and transforming the physical state of memory of the computer.

3.1. Event-Driven Data Processing

Figure 4A:
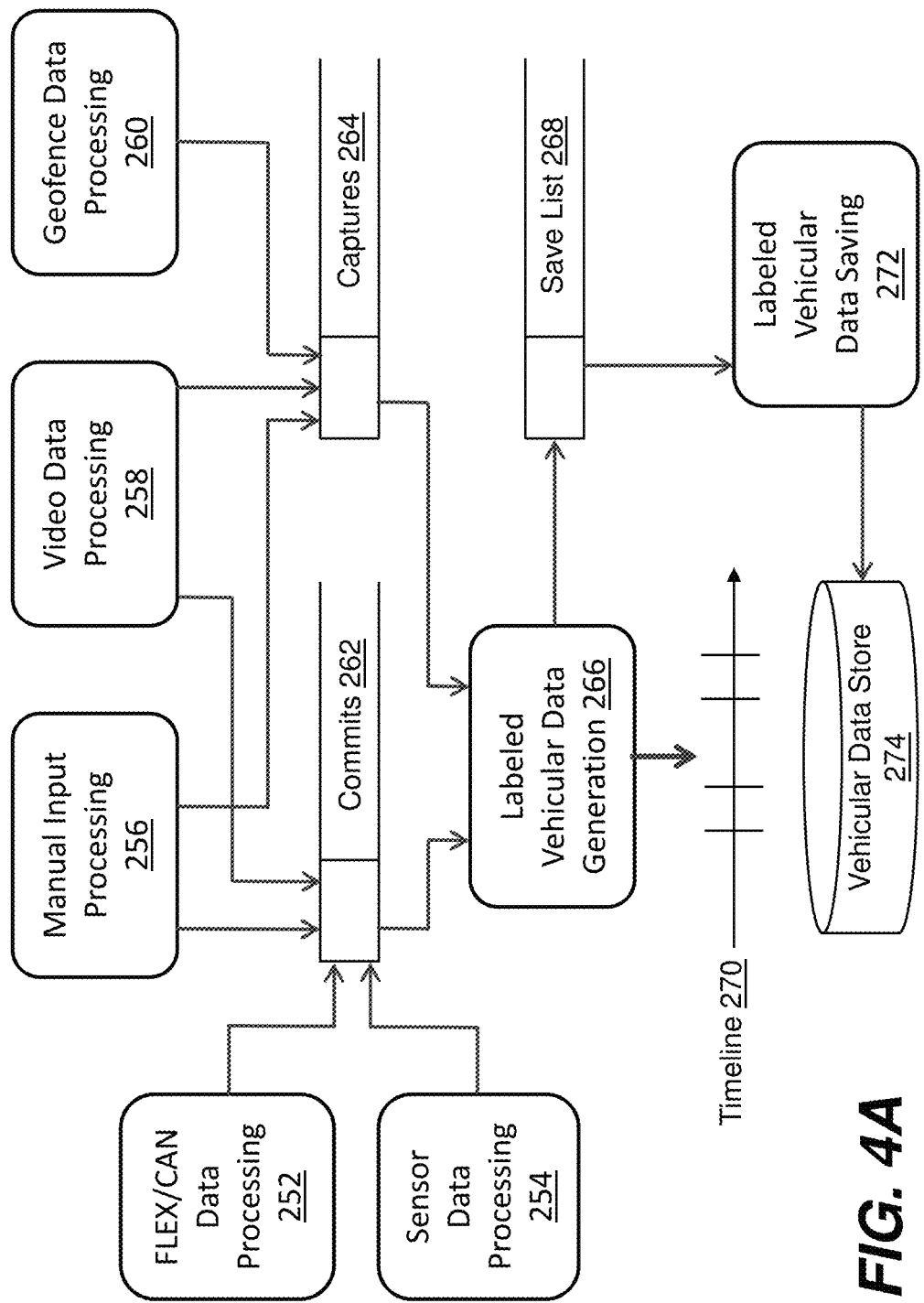
FIG. 4A illustrates an example event driven vehicle data processing framework.

FIG. 4A is an illustrative view of various aspects of an example event driven vehicle data processing framework—e.g., implemented by a test and evaluation system 200 of FIG. 2A—in which some or all techniques described herein may be practiced, according to an embodiment. The framework can be implemented with one or more computing devices. The one or more computing devices comprise any combination of hardware and software configured to implement the various operations relating to collecting vehicle data, synchronizing the collected vehicle data and/or generating labeled vehicular data described herein, including video data processing 258, FLEX data, CAN data and/or additional (e.g., vehicle, etc.) sensor data processing 252, geofence data processing 260, (e.g., non-vehicle, mobile phone, embedded device, etc.) sensor data processing 254, manual input processing 256, labeled vehicular data generation 266, and labeled vehicular data saving 272. For example, the one or more computing devices may include one or more memories storing instructions for implementing the various operations described herein, one or more hardware processors configured to execute the instructions stored in the one or more memories, and various data repositories in the one or more memories for storing data structures utilized and manipulated by the various operations.

Some or all of the operations relating to collecting vehicle data, synchronizing the collected vehicle data and/or generating labeled vehicular data can be performed in an asynchronous manner using producer-consumer and/or publisher-subscriber models.

As shown in FIG. 4A, in some operational scenarios, operations such as the geofence data processing (260), the video data processing (258) and the manual input processing (256) can post event messages as event message producers/publishers into a capture queue 264 (denoted as "Captures"), when events/occurrences of data saving/capture, data deletion, etc., are detected. On the other hand, operations such as the labeled vehicular data generation (266) can listen or subscribe to any new event messages produced/published in the capture queue (264), retrieve or dequeue (e.g., including remove, etc.) the new event messages, accessing underlying event data/content specified, pointed and/or referenced in the new event messages, and perform subsequent operations accordingly.

Operations such as the video data processing (258), the manual input processing (256), the FLEX/CAN data processing (252), the sensor data processing (254), etc., can post event messages as event message producers/publishers into a commit queue 262 (denoted as "Captures"), when vehicle data and data generated with manual input are collected or received. On the other hand, operations such as the labeled vehicular data generation (266) can listen or subscribe to any new event messages produced/published in the commit queue (262), retrieve or dequeue (e.g., including remove, etc.) the new event messages, accessing underlying event data/content specified, pointed and/or referenced in the new event messages, and perform subsequent operations accordingly.

The labeled vehicular data generation (266) can synchronize the collected vehicle data retrieved from the commit queue (262) and generate corresponding labeled vehicular data in compliance with any applicable laws/regulations/standards that protect data privacy—using timing information received with the collected vehicle data as well as data deletion and/or saving messages from the capture queue (264)—by way of a message timeline 270. The labeled vehicular data generation (266) can produce, publish and/or queue—e.g., as a producer, publisher and/or enqueuer—data items or datasets of the collected vehicle data and the generated labeled vehicular data into a save list 268.

Operations such as the labeled vehicular data saving (272) can consume, publish and/or dequeue the data items or datasets of the collected vehicle data and the generated labeled vehicular data from the save list (268), and store these data items or datasets in a vehicular data store (274). This may involve directly uploading the data items or datasets to the cloud based computing and storage system (104) and/or the backend driving assistance system (106) or indirectly uploading the data items or datasets to a cloud based or backend system (geographically away from the vehicle) with a local storage space as a temporary staging area.

3.2. Video Data Processing

Figure 4B:
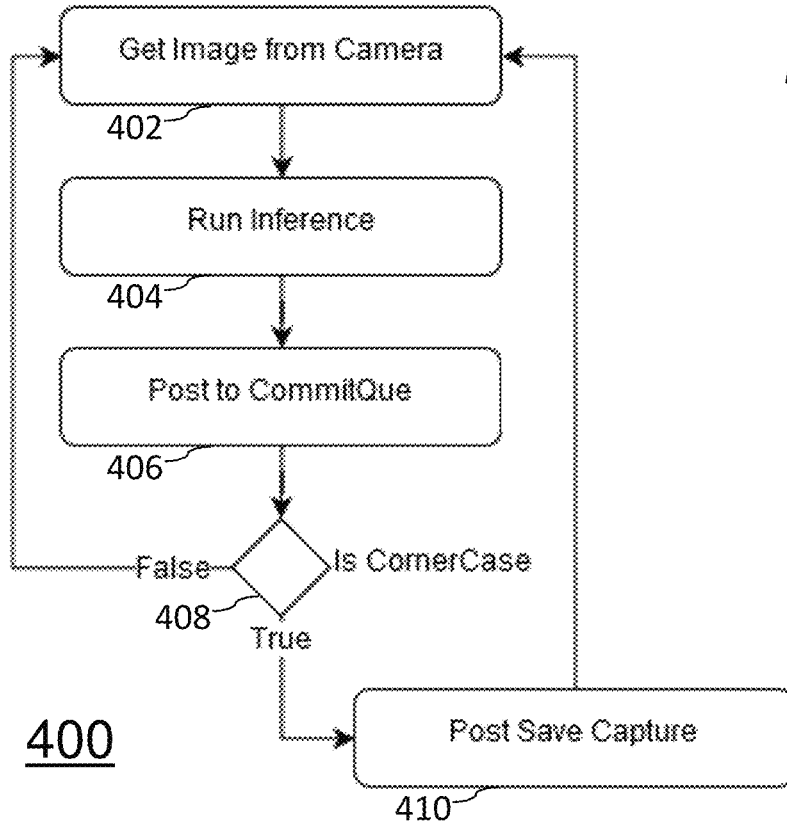

FIG. 4B illustrates an example processing flow 400 for video data processing (e.g., 258 of FIG. 4A, etc.), according to an embodiment. The various elements of the flow (400) may be performed in a variety of systems (e.g., one or more classical computing devices, etc.), including systems such as the system (200) described above. In an embodiment, each of the processes described in connection with the functional blocks described below may be implemented using one or more computer programs, other software elements, and/or digital logic in any of a general-purpose computer or a special-purpose computer, while performing data retrieval, transformation, and storage operations that involve interacting with and transforming the physical state of memory of the computer. The flow (400) illustrates but one example flow for video data processing (258). Other flows may involve additional or fewer steps, in potentially varying arrangements.

The flow (400) may be used to process vehicle data such as video images (e.g., road images, RGB images, LIDAR images, consecutive images, etc.) and automatically detect corner cases from image analytical results derived from the video images. In some operational scenarios, the flow (400) may be performed by a vehicular data generator (e.g., 212 of FIG. 2A, etc.) or a data pipeline block and/or a data label block (e.g., 220 and/or 218 of FIG. 2A, etc.).

Block 402 comprises receiving video images via video input (e.g., 202 of FIG. 2A, etc.) from an image acquisition device. Example image acquisition devices may include, but are not necessarily limited to only, any of: mobile phone cameras, USB cameras, LIDAR sensors, range sensors, etc. These video images may be received by way of a vehicle data collector (e.g., 210 of FIG. 2A, etc.).

Block 404 comprises performing inference operations with respect to the received video image(s) to generate image analytical results of the video images. The inference operations such as Yolo, SSD, lane detection, vehicle turning detection, vehicle passing detection, and so on may be performed by NNs implemented by pipeline modules in the data pipeline block (220). The image analytical results may comprise automatic tagging labels, single-dimensional or multi-dimensional features, tensors, arrays, lists, and so on.

Block 406 comprises posting the video images and image analytical results of the video images generated by the inference operations to a commit queue (e.g., 262 of FIG. 4A, etc.). In various embodiments, posting the video images and image analytical results into the commit queue (262) may involve posting underlying data constituting the video images and image analytical results or simply posting references/pointers to the underlying data.

Block 408 comprises determining whether a corner case is depicted in the video images. Corner cases as described herein can be detected in a variety of different ways based on the video images and/or other collected data.

Block 410 comprises, in response to determining that the corner case is depicted in the video images, posting an event message in a capture queue (e.g., 264 of FIG. 4A, etc.) to indicate or identify the corner case. Otherwise, in response to determining that the corner case is not depicted in the video images, the flow (400) goes back to block 402 and repeat the foregoing operations with respect to subsequently received video images.

In an example, the corner case can be detected based on differences, deviations or errors between predicted driving decisions and actual driving decisions. The predicted driving decisions (e.g., left turn, etc.) may be generated from a driving assistance predictive model implemented with or without NNs, whereas actual driving decisions (e.g., right turn or straight, etc.) may be detected using operational or sensor data from a driving assistance sub-system, GPS module, accelerator or motion sensors, etc.

In another example, the corner case can also be detected by NNs or by analyzing outputs generated by the NNs. The outputs may comprise actual features and/or tensors that deviate from or fall within expected features and/or tensors or expected distributions of features and/or tensors. Metrics and/or thresholds can be compared—for example by a novelty pipeline module in the vehicular data generation block (212)—with differences, deviations or errors between the actual features and/or tensors and the expected features and/or tensors or expected distributions of features and/or tensors, thereby determining whether a corner case has occurred.

In some operational scenarios, the system (200) applies principal component analysis (PCA) to features, tensors, data points, distributions of the foregoing, etc., obtained from video or non-video vehicle data collected by the system (200) in real time or in near real time. PCA results generated by the system (200) may be compared with PCA results generated from training or testing data by the backend driving assistance system (106) for expected cases (or non-corner cases). Metrics and/or thresholds along with the PCA results for the expected cases may be provided to the system (200) to help determine whether the PCA results generated by the system (200) in real time or in near real time differ (e.g., significantly, over a PCA result threshold, etc.) from—or is likely (e.g., with a confidence level over a confidence level threshold, a probability higher than a probability threshold, etc.) the same as or similar to—the PCA results for the expected cases. If the PCA results generated by the system (200) from the underlying data differ—or is not likely the same as or similar to—the expected cases, then the system (200) can mark the underlying video or non-video data as relating to a corner case. Otherwise, the system (200) marks the underlying data as relating to an expected case.

Additionally, optionally or alternatively, corner cases can be marked or triggered manually by a user.

In operational scenarios in which labeled vehicular data is collected or uploaded for corner cases, collected underlying vehicle data or any labeled vehicular data determined to be relating to expected cases may be ignored or removed without being uploaded to the cloud based computing and storage system (104) or the backend driving assistance system (106).

In operational scenarios in which labeled vehicular data is collected or uploaded for trips or for fixed time durations in the trips, collected underlying vehicle data or any labeled vehicular data—regardless of whether relating to expected cases or corner cases—may not be ignored or removed, but rather will be uploaded to the cloud based computing and storage system (104) or the backend driving assistance system (106).

3.3. FLEX/CAN Data Processing

Figure 4C:
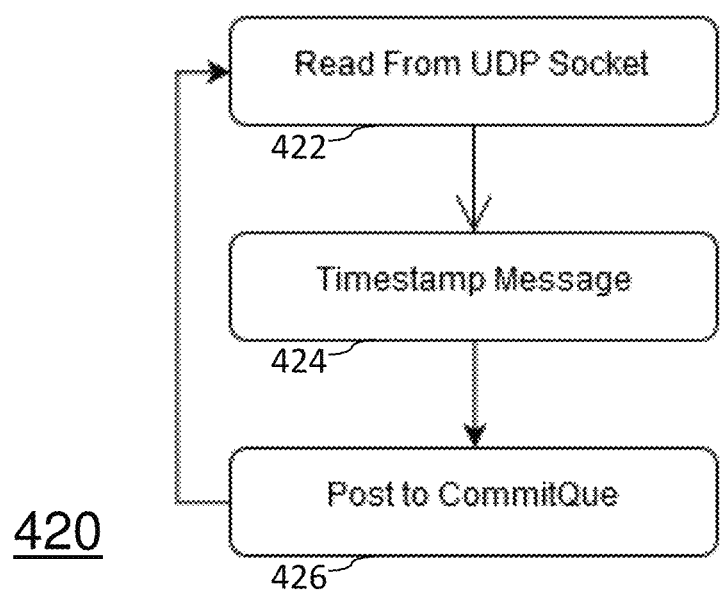

FIG. 4C illustrates an example processing flow 420 for FLEX/CAN data processing (e.g., 252 of FIG. 4A, etc.), according to an embodiment. The various elements of the flow (420) may be performed in a variety of systems (e.g., one or more classical computing devices, etc.), including systems such as the system (200) described above. In an embodiment, each of the processes described in connection with the functional blocks described below may be implemented using one or more computer programs, other software elements, and/or digital logic in any of a general-purpose computer or a special-purpose computer, while performing data retrieval, transformation, and storage operations that involve interacting with and transforming the physical state of memory of the computer. The flow (420) illustrates but one example flow for FLEX/CAN data processing (252). Other flows may involve additional or fewer steps, in potentially varying arrangements.

The flow (420) may be used to process vehicle data such as FLEX/CAN data (e.g., from a FLEX input, from a CAN input, etc.). In some operational scenarios, the flow (420) may be performed by a vehicle data collector (e.g., 210 of FIG. 2A, etc.).

Block 422 comprises receiving data transmission frames (or units) via FLEX/CAN inputs (e.g., 206 and 204 of FIG. 2A, etc.)—e.g., through a vehicle harness shared with or separate from onboard diagnostics (OBD)—from underlying automotive network communication networks already installed or deployed in the vehicle by the vehicle manufacturer of the vehicle to communicate with installed subsystems, electronic control units or modules (ECUs or ECMs) of the vehicle. Example data transmission frames may be, but are not necessarily limited to only, UDP messages received by UDP server(s), which can be implemented as a part of the system (200) to listen to arrivals of these UDP messages over one or more specific UDP sockets with unique combination(s) of source IP address, source port, destination IP address, destination port and socket number. Each of the data transmission frames as received via the FLEX/CAN inputs (206 and 204) may comprise a number of FLEX/CAN data fields such as transmission and/or reception timestamp(s), sequence number, frame ID, cyclic redundancy check (CRC), payload, etc.

Block 424 comprises extracting individual timing information of datasets of vehicle data carried in the data transmission frames from respective timestamps carried in the data transmission. A logical data structure generated by a sender at application/session level of the network protocol hierarchy to carry one or more datasets of vehicle data may be carried or encapsulated as payload(s) in a single frame or multiple frames.

Block 426 comprises posting the datasets of vehicle data received via the FLEX/CAN inputs (206 and 204) along with the individual timing information for the datasets in the commit queue (262).

3.4. Geofence Data Processing

Figure 4D:
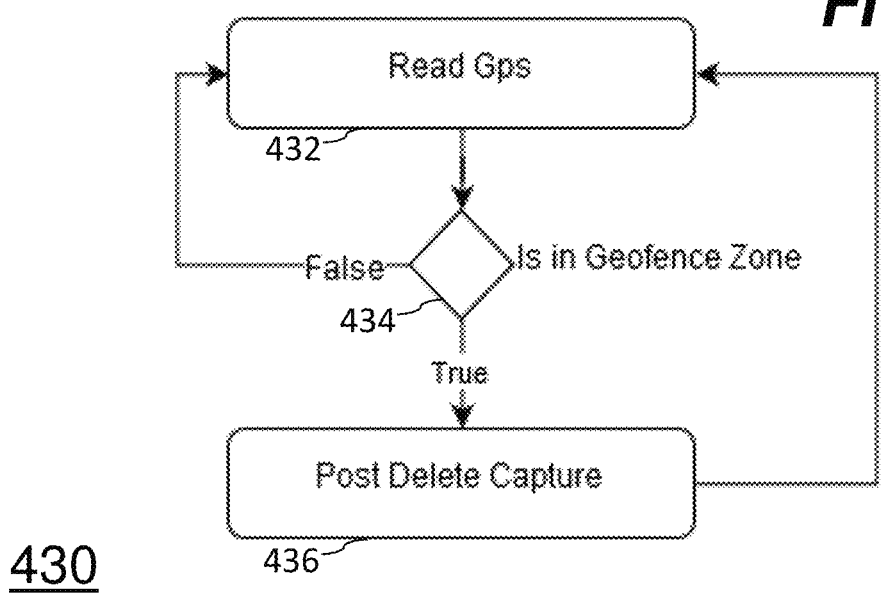

FIG. 4D illustrates an example processing flow 430 for geofence data processing (e.g., 260 of FIG. 4A, etc.), according to an embodiment. The various elements of the flow (430) may be performed in a variety of systems (e.g., one or more classical computing devices, etc.), including systems such as the system (200) described above. In an embodiment, each of the processes described in connection with the functional blocks described below may be implemented using one or more computer programs, other software elements, and/or digital logic in any of a general-purpose computer or a special-purpose computer, while performing data retrieval, transformation, and storage operations that involve interacting with and transforming the physical state of memory of the computer. The flow (430) illustrates but one example flow for GPS data processing (260). Other flows may involve additional or fewer steps, in potentially varying arrangements.

The flow (430) may be used to process GPS data in combination with geofence data. The geofence data may be downloaded to or configured in the system (200). The geofence data may specify which geographic zones are excluded from recording vehicle data or generating labeled vehicular data. Example geographic zones may include, but are not necessarily limited to only, continents, countries, geographic regions, locations, areas, streets, highways, dwellings, buildings, parks, entertainment venues, etc. In some operational scenarios, the flow (430) may be performed by a vehicle data collector (e.g., 210 of FIG. 2A, etc.) and/or a labeled vehicular data generator (e.g., 212 of FIG. 2A, etc.).

Block 432 comprises receiving GPS—which may also refer to any equivalent geolocational—data in real time or in near real time. The GPS data may comprise GPS coordinate values indicative of geolocational positions of the vehicle in real time or in near real time.

Block 434 comprises determining, based on the received GPS data and downloaded or configured geofence data, whether the vehicle is in a geographic zone excluded from recording vehicle data or derived vehicle data.

Block 436 comprises, in response to that the vehicle is in a geographic zone excluded from recording original or derived vehicle data, posting an event message to indicate so in the capture queue (264). This message posting operation is skipped in response to that the vehicle is not in such a geographic zone. In any event, the process flow goes back to block 432.

3.5. Sensor Data Processing

Figure 4E:
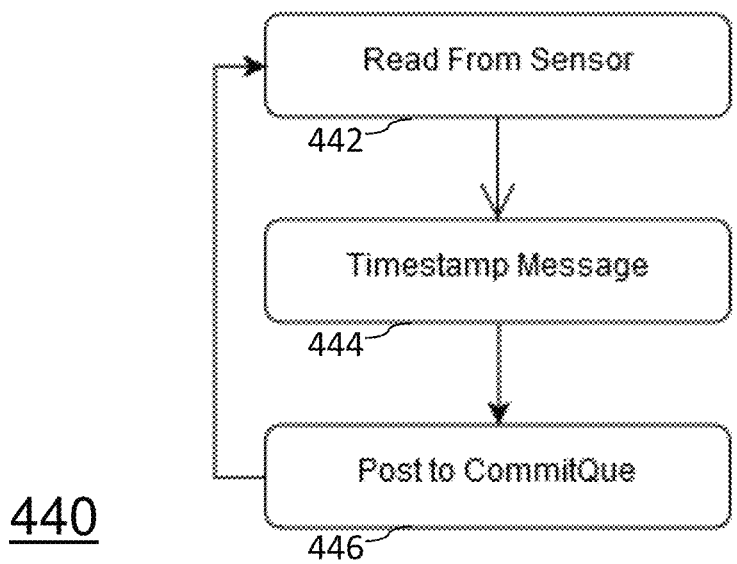

FIG. 4E illustrates an example processing flow 440 for device data processing (e.g., 254 of FIG. 4A, etc.), according to an embodiment. The various elements of the flow (440) may be performed in a variety of systems (e.g., one or more classical computing devices, etc.), including systems such as the system (200) described above. In an embodiment, each of the processes described in connection with the functional blocks described below may be implemented using one or more computer programs, other software elements, and/or digital logic in any of a general-purpose computer or a special-purpose computer, while performing data retrieval, transformation, and storage operations that involve interacting with and transforming the physical state of memory of the computer. The flow (440) illustrates but one example flow for device data processing (254). Other flows may involve additional or fewer steps, in potentially varying arrangements.

The flow (440) may be used to process vehicle data such as sensor data from additional sensor input (e.g., 208 of FIG. 1A, etc.) or from a mobile device and/or an embedded device in an applicable system configuration of the system (200). In some operational scenarios, the flow (440) may be performed by a vehicle data collector (e.g., 210 of FIG. 2A, etc.).

Block 442 comprises receiving sensor data from vehicle data sources other than FLEX/CAN. The sensor data may include, but is not necessarily limited to only, data generated by any of: mobile phone sensors, embedded device sensors, vehicle sensors, LIDAR sensors, geolocational sensors/devices, ambient light sensor, proximity sensor, gravity sensor or accelerometer, gyroscope, compass, Hall effect sensor, barometer, fingerprint sensor, and so on.

Block 444 comprises extracting or generating individual timing information of datasets of sensor data carried in the received sensor data from respective timestamps carried in the sensor data.

Block 446 comprises posting the datasets of sensor data along with the individual timing information for the datasets in the commit queue (262).

3.6. Manual Input Processing

Figure 4F:
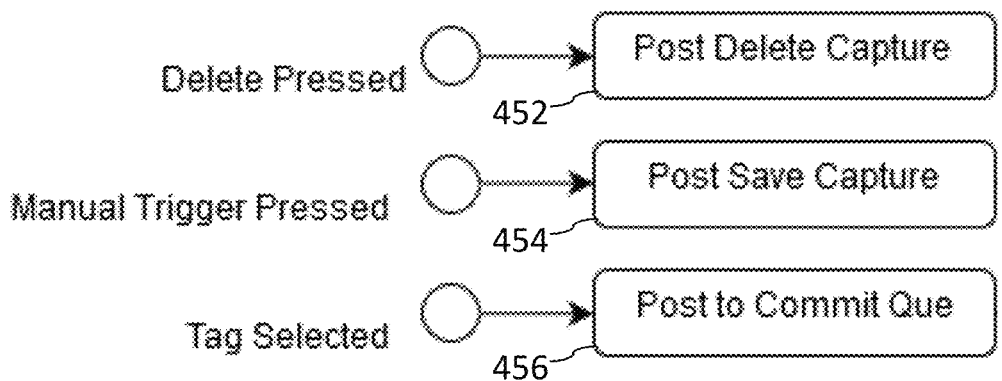

FIG. 4F illustrates an example processing flow 450 for manual input processing (e.g., 256 of FIG. 4A, etc.), according to an embodiment. The various elements of the flow (450) may be performed in a variety of systems (e.g., one or more classical computing devices, etc.), including systems such as the system (200) described above. In an embodiment, each of the processes described in connection with the functional blocks described below may be implemented using one or more computer programs, other software elements, and/or digital logic in any of a general-purpose computer or a special-purpose computer, while performing data retrieval, transformation, and storage operations that involve interacting with and transforming the physical state of memory of the computer. The flow (450) illustrates but one example flow for manual input processing (256). Other flows may involve additional or fewer steps, in potentially varying arrangements.

The flow (450) may be used to process manual input from the user, generate manual tagging labels, initiate data recording for user-triggered corner cases, etc. In some operational scenarios, the flow (450) may be performed with a UI (e.g., 216 of FIG. 2A, etc.) operating in conjunction with a vehicle data collector (e.g., 210 of FIG. 2A, etc.) and/or a vehicular data generator (e.g., 212 of FIG. 2A, etc.).

Block 452 comprises, in response to receiving user input indicating a "Delete" UI control button rendered on a display page is pressed or selected by a user operating with the mobile device (232) or the user device (242), posting a "Delete" event message in the capture queue (264). This "Delete" event message when processed causes collected vehicle data and/or labeled vehicular data for a time period to be deleted. The time period may be a default time period such as a time period demarcated by a first fixed time interval before receiving the user input and a second fixed time interval—which, in some operational scenarios, may be open ended until the user indicates a specific end time point for this deletion operation—after receiving the user input. Additionally, optionally or alternatively, additional UI interaction may be performed with the user to specify or select a specific time period for which the collected vehicle data and/or labeled vehicular data should be deleted.

Block 454 comprises, in response to receiving user input indicating a "Manual Trigger" UI control button rendered on a display page is pressed or selected by a user operating with the mobile device (232) or the user device (242), posting a "Save" event message in the capture queue (264). This "Manual Trigger" event message when processed causes collected vehicle data and/or labeled vehicular data for a time period to be saved and uploaded, regardless of whether a corner case has been detected. The time period may be a default time period such as a time period demarcated by a first fixed time interval before receiving the user input and a second fixed time interval—which, in some operational scenarios, may be open ended until the user indicates a specific end time point for this manual trigger operation—after receiving the user input. Additionally, optionally or alternatively, additional UI interaction may be performed with the user to specify or select a specific time period for which the collected vehicle data and/or labeled vehicular data should be deleted.

Block 456 comprises, in response to receiving user input indicating a "Tag Selected" UI control button rendered on a display page is pressed or selected by a user operating with the mobile device (232) or the user device (242), posting a "Tag Selected" event message in the commit queue (262). This "Tag Selected" event message when processed causes collected vehicle data and/or labeled vehicular data for a time period to be marked with a label specified in the "Tag Selected" event message. In some operational scenarios, multiple "Tag Selected" UI components corresponding to different labels may be rendered via the UI (216). The label identified in the posted "Tag Selected" event message may correspond to a specific "Tag Selected" UI component among all such UI components. Additionally, optionally or alternatively, the label identified in the posted "Tag Selected" event message may be specified through user interactions before, after or contemporaneously with the user input. The time period may be a default time period such as a time period demarcated by a first fixed time interval before receiving the user input and a second fixed time interval—which, in some operational scenarios, may be open ended until the user indicates a specific end time point for this manual trigger operation—after receiving the user input. Additionally, optionally or alternatively, additional UI interaction may be performed with the user to specify or select a specific time period for which the collected vehicle data and/or labeled vehicular data should be deleted.

3.7. Labeled Vehicular Data Generation

Figure 4H:
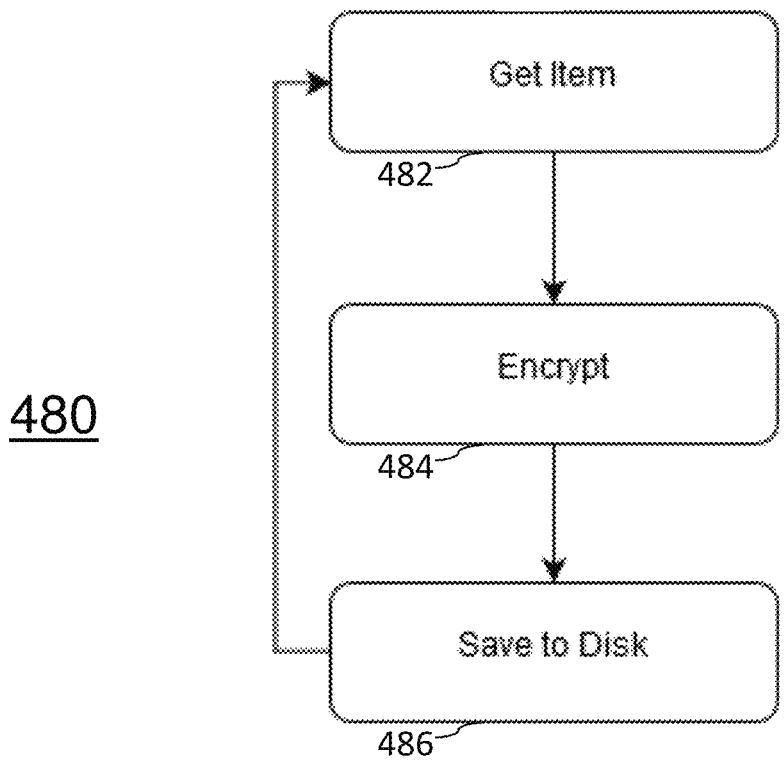
Figure 4G:
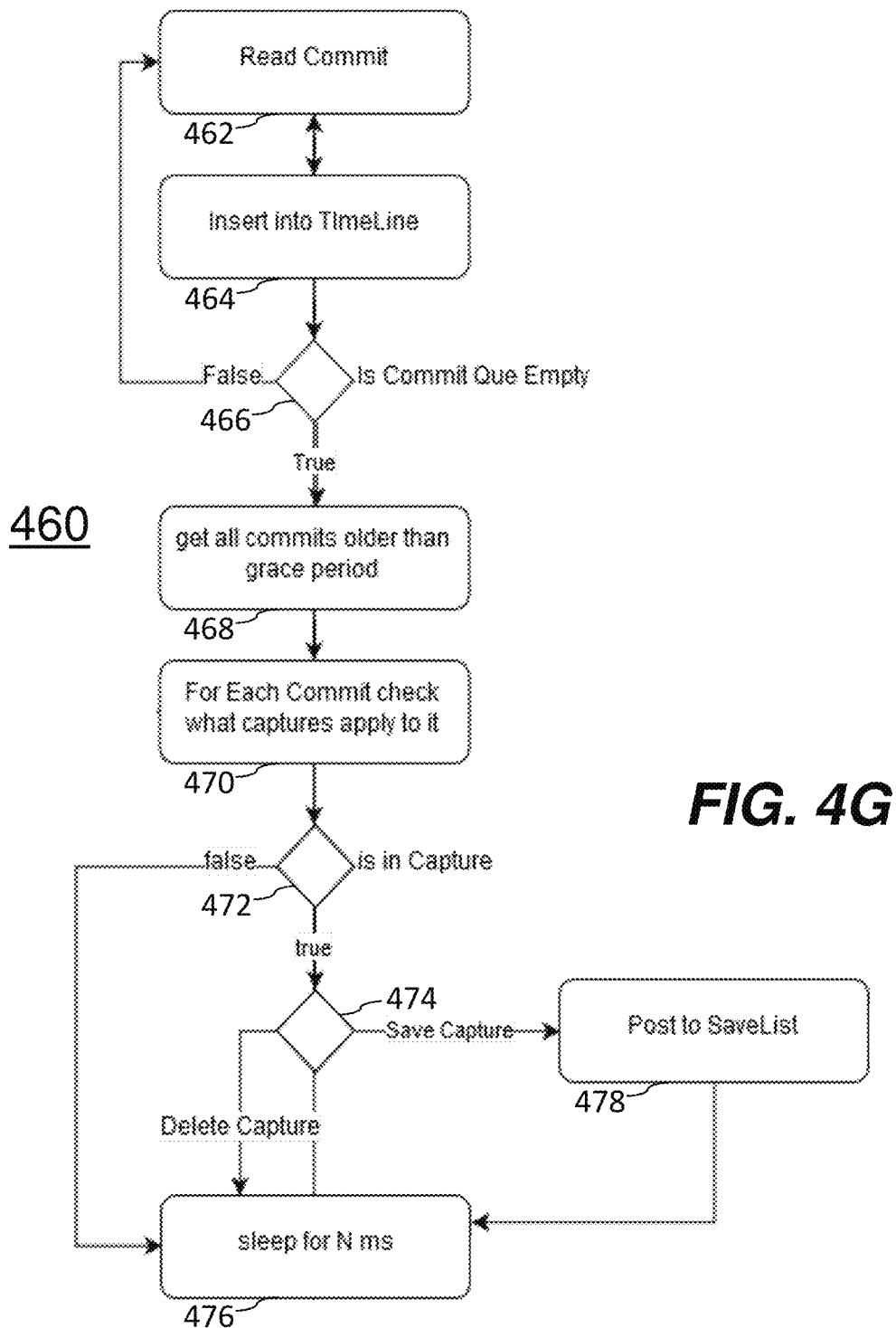

FIG. 4G illustrates an example processing flow 460 for labeled vehicular data generation (e.g., 266 of FIG. 4A, etc.), according to an embodiment. The various elements of the flow (460) may be performed in a variety of systems (e.g., one or more classical computing devices, etc.), including systems such as the system (200) described above. In an embodiment, each of the processes described in connection with the functional blocks described below may be implemented using one or more computer programs, other software elements, and/or digital logic in any of a general-purpose computer or a special-purpose computer, while performing data retrieval, transformation, and storage operations that involve interacting with and transforming the physical state of memory of the computer. The flow (460) illustrates but one example flow for the labeled vehicular data generation (266). Other flows may involve additional or fewer steps, in potentially varying arrangements.

The flow (460) may be used to process event messages, video or non-video vehicle data or pointers/references to the video or non-video vehicle data, etc., indicated, stored or otherwise indicated in the commit queue (262) and/or the capture queue (264), generate a timeline 270 in which the video or non-video vehicle data of different type(s) are synchronized, generate a saved list (e.g., 268 of FIG. 4A, etc.) of datasets of labeled vehicular data, etc. In some operational scenarios, the flow (460) may be performed by a vehicular data generator (e.g., 212 of FIG. 2A, etc.).

Block 462 comprises reading, dequeuing and/or removing a current event message from the commit queue (262), starting from the very first event message in the commit queue (262).

Block 464 comprises inserting a respective timeline message, corresponding to or derived from the current event message, into the timeline (270). The timeline message may, but is not required to, be identical to the current event message. The timeline message may comprise less, more or the same as the current event message.

Block 466 comprises determining whether the current event message is the last event message in the commit queue (262). In response to determining that the current event message is the last event message in the commit queue (262), the process flow goes to block 468 with the next event message in the commit queue (262) as a (new) current event. On the other hand, in response to determining that the current event message is the last event message in the commit queue (262), the process flow goes to block 462.

Block 468 comprises accessing or retrieving timeline messages older than a configured time period from the timeline (270). The configured time period may be a statically or dynamically configured time period, last five minutes, last ten minutes, measured from a current wall clock time point at runtime, measured from a current logical time at runtime, and so on.

Block 470 comprises looking up the capture queue (264) to determine, for each timeline message among the retrieved time messages from the timeline (270), a respective set of zero, one or more capture messages in the capture queue (264) to be applied to the timeline message.

Block 472 comprises determining whether a respective set of capture messages is empty for each timeline message among the retrieved time messages from the timeline (270). In response to determining that a respective set of capture messages is empty for each timeline message among the retrieved time messages from the timeline (270), the process flow goes to block 476. Otherwise, in response to determining that at least one respective set of capture messages is non-empty for at least one timeline message among the retrieved time messages from the timeline (270), the process flow goes to block 474.

Block 474 comprises, for each timeline message among the retrieved time messages with a non-empty set of capture messages, using the non-empty set of capture messages to determine whether dataset(s) of collected vehicle data and/or labeled vehicular data represented by or in connection with the timeline message are to be saved. In response to determining that dataset(s) of collected vehicle data and/or labeled vehicular data represented by or in connection with the timeline message are to be saved, the process flows goes to block 278, which comprises saving or caching the dataset(s) of collected vehicle data and/or labeled vehicular data as a save item in the save list (268). On the other hand, in response to determining that dataset(s) of collected vehicle data and/or labeled vehicular data represented by or in connection with the timeline message are not to be saved, the system (200) deletes the timeline message from the timeline (270) as well as avoids saving or caching the dataset(s) of collected vehicle data and/or labeled vehicular data in the save list (268).

Block 476 comprises sleeping for a relatively short time period such as N milliseconds, where N is a positive integer such as one (1), five (5), ten (10), twenty (20), fifty (50), one hundred (100), or the like. The process flow then goes back to block 462.

3.8. Labeled Vehicular Data Saving

FIG. 4H illustrates an example processing flow 480 for labeled vehicular data saving (e.g., 272 of FIG. 4A, etc.), according to an embodiment. The various elements of the flow (460) may be performed in a variety of systems (e.g., one or more classical computing devices, etc.), including systems such as the system (200) described above. In an embodiment, each of the processes described in connection with the functional blocks described below may be implemented using one or more computer programs, other software elements, and/or digital logic in any of a general-purpose computer or a special-purpose computer, while performing data retrieval, transformation, and storage operations that involve interacting with and transforming the physical state of memory of the computer. The flow (480) illustrates but one example flow for the labeled vehicular data saving (272). Other flows may involve additional or fewer steps, in potentially varying arrangements.

The flow (480) may be used to store the labeled vehicular data including but not limited to the timeline (270) that synchronized various different types of vehicle data collected by the system (200). In some operational scenarios, the flow (480) may be performed by a vehicular data generator (e.g., 212 of FIG. 2A, etc.).

Block 482 comprises reading, dequeuing and/or removing a current save item from the save list (268), starting from the very first save item in the save list (268).

Block 484 comprises applies encryption to dataset(s) of collected vehicle data and/or generated labeled vehicular data represented in or in connection with the current save item to generate an encrypted version of the dataset(s) of collected vehicle data and/or generated labeled vehicular data.

Block 486 comprises saving the encrypted version of the dataset(s) of collected vehicle data and/or generated labeled vehicular data in the vehicle data store (274), which can then be uploaded or synchronized with corresponding data stores in a cloud based computing and storage system (e.g., 104 of FIG. 1, etc.) or a backend driving assistance system (e.g., 106 of FIG. 1, etc.). The process flow then goes back to block 482.

In some embodiments, a producer-consumer model, a publisher-subscriber model, etc., may be used in inserting, storing, or enqueuing event messages, data items, etc., into, as well as reading, retrieving, or dequeuing event messages, data items, etc., from, a data storage construct such as the commit queue (262), the capture queue (266), save list (274), etc. These operations may be performed asynchronously without waiting, thereby increasing computational efficiency and response time.

4.0. EXAMPLE PROCESS FLOWS

FIG. 4I illustrates an example process flow 490 according to an embodiment. In some embodiments, one or more computing devices or components may perform this process flow. In block 492, a system as described herein collects video data through a video data interface and non-video data through a non-video data interface respectively from an image acquisition device and a non-video data source. The image acquisition device and the non-video data source are collocated with a vehicle.

In block 494, the system uses timing information received with the video data and with the non-video data to synchronize the video data and the non-video data into synchronized vehicle data. Datasets of the synchronized vehicle data share a common timeline. The common timeline indicates individual time points to which the datasets of the synchronized vehicle data respectively correspond.

In block 496, the system identifies specific labels to be applied to the synchronized vehicle data. The labels indicate ground truths for the synchronized vehicle data.

In block 498, the system generates labeled vehicular data from the synchronized vehicle data and the specific labels. At least a portion of the labeled vehicular data to be used to test and evaluate assisted driving functionality.

In an embodiment, the assisted driving functionality includes generating predictions for driving decisions in different driving conditions.

In an embodiment, the image acquisition device represents one of: a mobile phone camera, an external camera attached to a device collocated in the vehicle, a LIDAR device, etc.

In an embodiment, the non-video data source represents a data source communicated through one or more of: FlexRay protocols, CAN protocols, TCP/IP protocols, USB protocols, BlueRay protocols, Wi-Fi protocols, etc.

In an embodiment, the labels comprise one or more of: manual tagging labels, automatic tagging labels, etc.

In an embodiment, the automatic tagging labels comprise one or more labels automatically generated by neural networks implemented on an end user device collocated with the vehicle.

In an embodiment, the manual tagging labels comprise one or more labels determined at least in part from user input received through a user interface.

In an embodiment, a computing device is configured to perform any of the foregoing methods. In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

In an embodiment, a computing device comprising one or more processors and one or more storage media storing a set of instructions which, when executed by the one or more processors, cause performance of any of the foregoing methods.

Other examples of these and other embodiments are found throughout this disclosure. Note that, although separate embodiments are discussed herein, any combination of embodiments and/or partial embodiments discussed herein may be combined to form further embodiments.

5.0. IMPLEMENTATION MECHANISM—HARDWARE OVERVIEW

According to one embodiment, the techniques described herein are implemented by one or more special-purpose computing devices. The special-purpose computing devices may be desktop computer systems, portable computer systems, handheld devices, smartphones, media devices, gaming consoles, networking devices, or any other device that incorporates hard-wired and/or program logic to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques.

Figure 5:
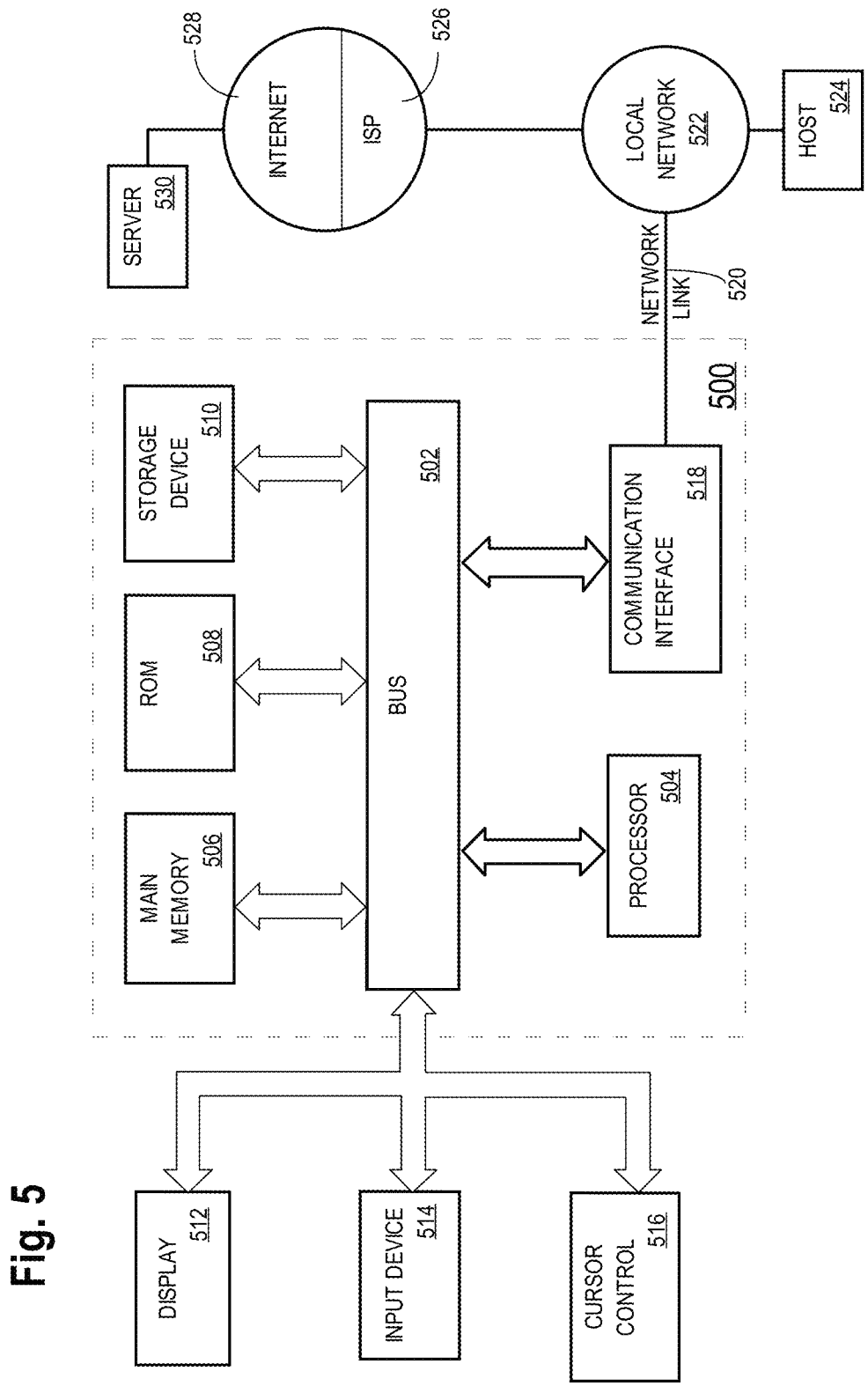
FIG. 5 is block diagram of a computer system upon which embodiments of the invention may be implemented.

FIG. 5 is a block diagram that illustrates a computer system 500 utilized in implementing the above-described techniques, according to an embodiment. Computer system 500 may be, for example, a desktop computing device, laptop computing device, tablet, smartphone, server appliance, computing main image, multimedia device, handheld device, networking apparatus, or any other suitable device.

Computer system 500 includes one or more busses 502 or other communication mechanism for communicating information, and one or more hardware processors 504 coupled with busses 502 for processing information. Hardware processors 504 may be, for example, a general purpose microprocessor. Busses 502 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 500 also includes a main memory 506, such as a random access memory (RAM) or other dynamic or volatile storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes one or more read only memories (ROM) 508 or other static storage devices coupled to bus 502 for storing static information and instructions for processor 504. One or more storage devices 510, such as a solid-state drive (SSD), magnetic disk, optical disk, or other suitable non-volatile storage device, is provided and coupled to bus 502 for storing information and instructions.

Computer system 500 may be coupled via bus 502 to one or more displays 512 for presenting information to a computer user. For instance, computer system 500 may be connected via an High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 512 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 512.

In an embodiment, output to display 512 may be accelerated by one or more graphics processing unit (GPUs) in computer system 500. A GPU may be, for example, a highly parallelized, multi-core floating point processing unit highly optimized to perform computing operations related to the display of graphics data, 3D data, and/or multimedia. In addition to computing image and/or video data directly for output to display 512, a GPU may also be used to render imagery or other video data off-screen, and read that data back into a program for off-screen image processing with very high performance. Various other computing tasks may be off-loaded from the processor 504 to the GPU.

One or more input devices 514 are coupled to bus 502 for communicating information and command selections to processor 504. One example of an input device 514 is a keyboard, including alphanumeric and other keys. Another type of user input device 514 is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. Yet other examples of suitable input devices 514 include a touch-screen panel affixed to a display 512, cameras, microphones, accelerometers, motion detectors, and/or other sensors. In an embodiment, a network-based input device 514 may be utilized. In such an embodiment, user input and/or other information or commands may be relayed via routers and/or switches on a Local Area Network (LAN) or other suitable shared network, or via a peer-to-peer network, from the input device 514 to a network link 520 on the computer system 500.

A computer system 500 may implement techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and use a modem to send the instructions over a network, such as a cable network or cellular network, as modulated signals. A modem local to computer system 500 can receive the data on the network and demodulate the signal to decode the transmitted instructions. Appropriate circuitry can then place the data on bus 502. Bus 502 carries the data to main memory 505, from which processor 504 retrieves and executes the instructions. The instructions received by main memory 506 may optionally be stored on storage device 510 either before or after execution by processor 504.

A computer system 500 may also include, in an embodiment, one or more communication interfaces 518 coupled to bus 502. A communication interface 518 provides a data communication coupling, typically two-way, to a network link 520 that is connected to a local network 522. For example, a communication interface 518 may be an integrated services digital network (ISDN) card, cable modem, satellite modem, or a modem to provide a data communication connection to a corresponding type of telephone line. As another example, the one or more communication interfaces 518 may include a local area network (LAN) card to provide a data communication connection to a compatible LAN. As yet another example, the one or more communication interfaces 518 may include a wireless network interface controller, such as a 802.11-based controller, Bluetooth controller, Long Term Evolution (LTE) modem, and/or other types of wireless interfaces. In any such implementation, communication interface 518 sends and receives electrical, electromagnetic, or optical signals that carry digital data streams representing various types of information.

Network link 520 typically provides data communication through one or more networks to other data devices. For example, network link 520 may provide a connection through local network 522 to a host computer 524 or to data equipment operated by a Service Provider 526. Service Provider 526, which may for example be an Internet Service Provider (ISP), in turn provides data communication services through a wide area network, such as the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

In an embodiment, computer system 500 can send messages and receive data, including program code and/or other types of instructions, through the network(s), network link 520, and communication interface 518. In the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution. As another example, information received via a network link 520 may be interpreted and/or processed by a software component of the computer system 500, such as a web browser, application, or server, which in turn issues instructions based thereon to a processor 504, possibly via an operating system and/or other intermediate layers of software components.

In an embodiment, some or all of the systems described herein may be or comprise server computer systems, including one or more computer systems 500 that collectively implement various components of the system as a set of server-side processes. The server computer systems may include web server, application server, database server, and/or other conventional server components that certain above-described components utilize to provide the described functionality. The server computer systems may receive network-based communications comprising input data from any of a variety of sources, including without limitation user-operated client computing devices such as desktop computers, tablets, or smartphones, remote sensing devices, and/or other server computer systems.

In an embodiment, certain server components may be implemented in full or in part using "cloud"-based components that are coupled to the systems by one or more networks, such as the Internet. The cloud-based components may expose interfaces by which they provide processing, storage, software, and/or other resources to other components of the systems. In an embodiment, the cloud-based components may be implemented by third-party entities, on behalf of another entity for whom the components are deployed. In other embodiments, however, the described systems may be implemented entirely by computer systems owned and operated by a single entity.

In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

6.0. EXTENSIONS AND ALTERNATIVES

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the drawings, the various components are depicted as being communicatively coupled to various other components by arrows. These arrows illustrate only certain examples of information flows between the components. Neither the direction of the arrows nor the lack of arrow lines between certain components should be interpreted as indicating the existence or absence of communication between the certain components themselves. Indeed, each component may feature a suitable communication interface by which the component may become communicatively coupled to other components as needed to accomplish any of the functions described herein.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   collecting, asynchronously, video data through a video data interface from an image acquisition device and non-video data through a non-video data interface from a non-video data source, the image acquisition device and the non-video data source being collocated with a vehicle;
   using first timing information received with the video data and second timing information received with the non-video data to synchronize the video data and the non-video data into synchronized vehicle data, datasets of the synchronized vehicle data having a common timeline, the common timeline indicating individual time points to which the datasets of the synchronized vehicle data respectively correspond, wherein the first timing information is generated by a video encoder of the image acquisition device;
   identifying specific labels to be applied to the synchronized vehicle data, the labels indicating ground truths for the synchronized vehicle data; and
   generating, by one or more computing devices collocated with the vehicle, labeled vehicular data from the synchronized vehicle data and the specific labels.

2. The method of claim 1, wherein at least a portion of the labeled vehicular data is used for testing and evaluation of assisted driving functionality of the vehicle and wherein the assisted driving functionality includes generating predictions for driving decisions in different driving conditions.

3. The method of claim 1, wherein the image acquisition device is at least one from a group including a mobile phone camera, an external camera attached to a device collocated in the vehicle, a LIDAR device, and combinations thereof.

4. The method of claim 1, wherein the non-video data source represents a data source communicated through one or more from a group including: FlexRay protocols, CAN protocols, TCP/IP protocols, USB protocols, BlueRay protocols, Wi-Fi protocols, and combinations thereof.

5. The method of claim 1, wherein the labels comprise one or more of: manual tagging labels, or automatic tagging labels.

6. The method of claim 5, wherein the automatic tagging labels comprise one or more labels automatically generated by neural networks implemented on an end user device collocated with the vehicle.

7. The method of claim 5, wherein the manual tagging labels comprise one or more labels determined at least in part from user input received through a user interface.

8. The method of claim 1, wherein the one or more computing devices is at least one mobile device and wherein the at least one mobile device performs the collecting, synchronizing and identifying steps.

9. One or more non-transitory computer readable media storing a program of instructions that is executable by one or more computing processors to perform:
   collecting, asynchronously, video data through a video data interface from an image acquisition device and non-video data through a non-video data interface from a non-video data source, the image acquisition device and the non-video data source being collocated with a vehicle;
   using first timing information received with the video data and second timing information received with the non-video data to synchronize the video data and the non-video data into synchronized vehicle data, datasets of the synchronized vehicle data having a common timeline, the common timeline indicating individual time points to which the datasets of the synchronized vehicle data respectively correspond, wherein the first timing information is generated by a video encoder of the image acquisition device;
   identifying specific labels to be applied to the synchronized vehicle data, the labels indicating ground truths for the synchronized vehicle data; and
   generating, by one or more computing devices collocated with the vehicle, labeled vehicular data from the synchronized vehicle data and the specific labels.

10. The media of claim 9, wherein at least a portion of the labeled vehicular data is used for testing and evaluation of assisted driving functionality of the vehicle and wherein the assisted driving functionality includes generating predictions for driving decisions in different driving conditions.

11. The media of claim 9, wherein the image acquisition device is at least one from a group including a mobile phone camera, an external camera attached to a device collocated in the vehicle, a LIDAR device, and combinations thereof.

12. The media of claim 9, wherein the non-video data source represents a data source communicated through one or more from a group including: FlexRay protocols, CAN protocols, TCP/IP protocols, USB protocols, BlueRay protocols, Wi-Fi protocols, and combinations thereof.

13. The media of claim 9, wherein the labels comprise one or more of: manual tagging labels, or automatic tagging labels.

14. The media of claim 13, wherein the automatic tagging labels comprise one or more labels automatically generated by neural networks implemented on an end user device collocated with the vehicle.

15. The media of claim 13, wherein the manual tagging labels comprise one or more labels determined at least in part from user input received through a user interface.

16. The media of claim 9, wherein the one or more computing devices is at least one mobile device and wherein the at least one mobile device performs the collecting, synchronizing and identifying steps.

17. A system, comprising: one or more computing processors; one or more non-transitory computer readable media storing a program of instructions that is executable by the one or more computing processors to perform:
- collecting, asynchronously, video data through a video data interface from an image acquisition device and non-video data through a non-video data interface from a non-video data source, the image acquisition device and the non-video data source being collocated with a vehicle;
- using first timing information received with the video data and second timing information received with the non-video data to synchronize the video data and the non-video data into synchronized vehicle data, datasets of the synchronized vehicle data having a common timeline, the common timeline indicating individual time points to which the datasets of the synchronized vehicle data respectively correspond, wherein the first timing information is generated by a video encoder of the image acquisition device;
- identifying specific labels to be applied to the synchronized vehicle data, the labels indicating ground truths for the synchronized vehicle data; and
- generating, by one or more computing devices collocated with the vehicle, labeled vehicular data from the synchronized vehicle data and the specific labels.

18. The system of claim 17, wherein at least a portion of the labeled vehicular data is used for testing and evaluation of assisted driving functionality of the vehicle and wherein the assisted driving functionality includes generating predictions for driving decisions in different driving conditions.

19. The system of claim 17, wherein the image acquisition device is at least one from a group including a mobile phone camera, an external camera attached to a device collocated in the vehicle, a LIDAR device, and combinations thereof.

20. The system of claim 17, wherein the non-video data source represents a data source communicated through one or more from a group including: FlexRay protocols, CAN protocols, TCP/IP protocols, USB protocols, BlueRay protocols, Wi-Fi protocols, and combinations thereof.

21. The system of claim 17, wherein the labels comprise one or more of: manual tagging labels, or automatic tagging labels.

22. The system of claim 21, wherein the automatic tagging labels comprise one or more labels automatically generated by neural networks implemented on an end user device collocated with the vehicle.

23. The system of claim 21, wherein the manual tagging labels comprise one or more labels determined at least in part from user input received through a user interface.

24. The system of claim 17, wherein the one or more computing devices is at least one mobile device and wherein the at least one mobile device performs the collecting, synchronizing and identifying steps.

\* \* \* \* \*